United States Patent [19]
Foo

[11] Patent Number: 5,692,775
[45] Date of Patent: Dec. 2, 1997

[54] METHOD AND APPARATUS FOR CONTROLLING AN OCCUPANT RESTRAINT SYSTEM IN RESPONSE TO SELECTED CRITERIA ZONE

[75] Inventor: Chek-Peng Foo, Ann Arbor, Mich.

[73] Assignee: TRW Inc., Lyndhurst, Ohio

[21] Appl. No.: 362,185

[22] Filed: Dec. 22, 1994

[51] Int. Cl.$^6$ ..................................................... B60R 21/32
[52] U.S. Cl. ........................................ 280/735; 364/425.05
[58] Field of Search ...................................... 280/735, 734; 364/425.05

[56] References Cited

U.S. PATENT DOCUMENTS

| | | |
|---|---|---|
| 3,911,391 | 10/1975 | Held et al. . |
| 4,166,641 | 9/1979 | Okada et al. . |
| 4,985,835 | 1/1991 | Sterler et al. . |
| 4,994,972 | 2/1991 | Diller . |
| 5,040,118 | 8/1991 | Diller ................................ 280/735 |
| 5,101,115 | 3/1992 | Nitschke et al. . |
| 5,157,268 | 10/1992 | Spies et al. ............................ 280/735 |
| 5,483,449 | 1/1996 | Caruso et al. ...................... 364/424.05 |
| 5,504,379 | 4/1996 | Mazur et al. ........................ 307/10.1 |

FOREIGN PATENT DOCUMENTS

| | | | |
|---|---|---|---|
| 342401 | 11/1989 | European Pat. Off. ............... 280/735 |
| 440133 | 8/1991 | European Pat. Off. ............... 280/735 |
| 2123359 | 1/1972 | Germany . |
| 9011207 | 10/1990 | WIPO . |
| 9321043 | 10/1993 | WIPO . |
| 9414638 | 7/1994 | WIPO . |

*Primary Examiner*—Eric D. Culbreth
*Attorney, Agent, or Firm*—Tarolli, Sundheim, Covell, Tummino & Szabo

[57] ABSTRACT

An apparatus is provided for detecting a vehicle crash condition and providing a signal indicative of such a crash condition. The apparatus includes a controller that determines crash velocity and crash displacement signal in response to sensed crash acceleration. The controller has a plurality of deployment criteria zones each defined by an associated range of crash velocity values and crash displacement values. Each of the plurality of deployment criteria zones has at least one associated crash metric. The controller selects one of the plurality of deployment criteria zones in response to both the crash velocity value and the crash displacement value. The controller further determines whether a crash metric of the selected deployment criteria zone indicates that a deployment crash condition is occurring. The controller provides a deployment signal in response to the crash metric indicating a deployment crash condition is occurring.

13 Claims, 21 Drawing Sheets

Fig.9  CRASH DISPLACEMENT D(k)

METHOD AND APPARATUS FOR CONTROLLING AN OCCUPANT RESTRAINT SYSTEM IN RESPONSE TO SELECTED CRITERIA ZONE

TECHNICAL FIELD

The present invention is directed to a vehicle occupant restraint system and is specifically directed to a method and apparatus for controlling a restraint in response to crash metrics of a selected criteria zone.

BACKGROUND OF THE INVENTION

Prior art vehicle occupant restraint systems monitor a crash acceleration signal over time, and deploy an occupant restraint when the acceleration signal indicates a deployment crash event. To evaluate the crash acceleration signal, known systems integrate, double integrate, and/or differentiate the crash acceleration signal to yield crash velocity, crash displacement, and jerk, respectively.

The crash acceleration, crash velocity, crash displacement, and crash jerk can be used in known crash metrics to determine if a deployment crash event is occurring. One known crash metric compares the value of one or more of crash acceleration, crash velocity, crash displacement, or jerk against associated threshold values to determine if a crash event is occurring.

SUMMARY OF THE INVENTION

The present invention is directed to a method and apparatus for controlling a restraint in response to crash metrics of a selected criteria zone. A plurality of deployment criteria zones are established wherein each criteria zone includes at least one associated crash metric. One of the deployment criteria zones is selected in response to crash velocity and crash displacement. A deployment signal is provided when a crash metric of the selected deployment criteria zone indicates a deployment crash condition is occurring.

In accordance with the present invention, an apparatus is provided for detecting a vehicle crash condition and providing a signal indicative of such a crash condition. The apparatus includes velocity means for providing a crash velocity signal having a value indicative of crash velocity. Displacement means provides a crash displacement signal having a value indicative of crash displacement. The apparatus further includes control means connected to the velocity means and the displacement means. The control means has a plurality of deployment criteria zones defined by an associated range of values of crash velocity and an associated range of values of crash displacement. Each of the plurality of deployment zones has at least one associated crash metric. The control means includes selection means for selecting one of the plurality of deployment criteria zones in response to both the crash velocity signal and the crash displacement signal. The control means further includes deployment determining means for determining whether a crash metric of the selected deployment criteria zone indicates that a deployment crash condition is occurring. The control means provides a deployment signal in response to a crash metric of a selected deployment criteria zone indicating that a deployment crash condition is occurring.

In accordance with another embodiment of the present invention, a method is provided for detecting a vehicle crash condition and providing a signal indicative thereof. The method comprises the steps of determining crash velocity and providing a crash velocity signal having a value indicative of crash velocity. Crash displacement is determined and a crash displacement signal is provided having a value indicative of crash displacement. The method further includes the steps of establishing a plurality of deployment criteria zones, wherein each established deployment criteria zone is defined by an associated range of values for the crash velocity signal and range of values for the crash displacement signal and establishing at least one associated crash metric for each of the deployment criteria zones. One of the plurality of deployment criteria zones is selected in response to both the crash velocity signal and the crash displacement signal. The method determines whether a crash metric of the selected deployment criteria zone indicates that a deployment crash condition is occurring. A deployment signal is provided when the crash metric of a selected deployment criteria zone indicates that a deployment crash condition is occurring.

BRIEF DESCRIPTION OF THE DRAWINGS

Further features and advantages of the present invention will become apparent to those skilled in the art to which the present invention relates from reading the following detailed description with reference to the accompanying drawings, in which.

DESCRIPTION OF A PREFERRED EMBODIMENT

Figure 1:
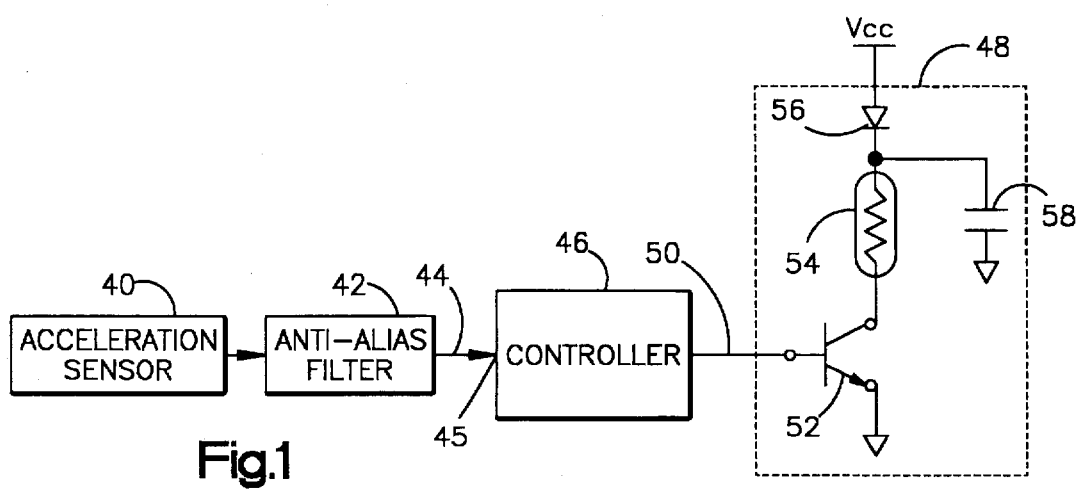
FIG. 1 is a block diagram illustrating the present invention.

Referring to FIG. 1, an acceleration sensor 40, such as an accelerometer, is mounted in an appropriate crash sensing location of a vehicle. Upon the occurrence of a vehicle crash condition, the acceleration sensor 40 provides an electrical signal having a characteristic indicative of vehicle crash acceleration. The output of the acceleration sensor 40 is connected to an anti-alias filter 42. The anti-alias filter 42 eliminates high frequency components from the signal provided by the acceleration sensor 40. The output 44 of the anti-alias filter 42 is connected to an analog-to-digital ("A/

D") input 45 of a controller 46. The controller 46 is preferably a microcomputer having an internal A/D converter, memory, etc.

The controller 46 periodically samples the filtered acceleration signal 44 and performs an analog-to-digital conversion on each sampled signal. The controller 46 further processes the digitized (i.e., the A/D converted) values of the sampled filtered acceleration signal 44 to determine whether a deployment crash event is occurring. A deployment crash event is one in which actuation or deployment of the actuatable restraining device is desirable. The process used to determine whether or not a deployment crash event is occurring includes evaluation of at least one of a plurality of crash metrics.

When the controller 46 determines a deployment crash event is occurring, it actuates an air bag actuation circuit 48 which results in deployment of an air bag (not shown) to restrain the vehicle occupant. An output 50 of controller 46 is connected to the base of transistor 52. When the air bag is to be deployed, the controller 46 provides a digital HIGH on output 50 which is to the base of a transistor 52. The emitter of the transistor 52 is connected to common or ground. One terminal of a squib 54 is connected to the collector of the transistor 52. The other terminal of the squib 54 is connected to a source of electrical energy $V_{cc}$, such as the vehicle battery, through a diode 56. A capacitor 58 is connected between the cathode of the diode 56 and common. The capacitor 58 ensures that a sufficient supply of electrical power will be present to energize the squib 54 should the electrical source $V_{cc}$ become disconnected from the anode side of the diode 56.

The controller 46 maintains its output 50 at a digital LOW when no deployment crash event is sensed as occurring. If the controller 46 determines a deployment crash event is occurring, the output 50 is switched to a digital HIGH. When the output 50 is a digital HIGH, the transistor 52 is turned ON allowing sufficient current to flow through the squib 54 and "fire" the squib. When the squib 54 is fired, inflation fluid is released to inflate the air bag.

Figure 2:
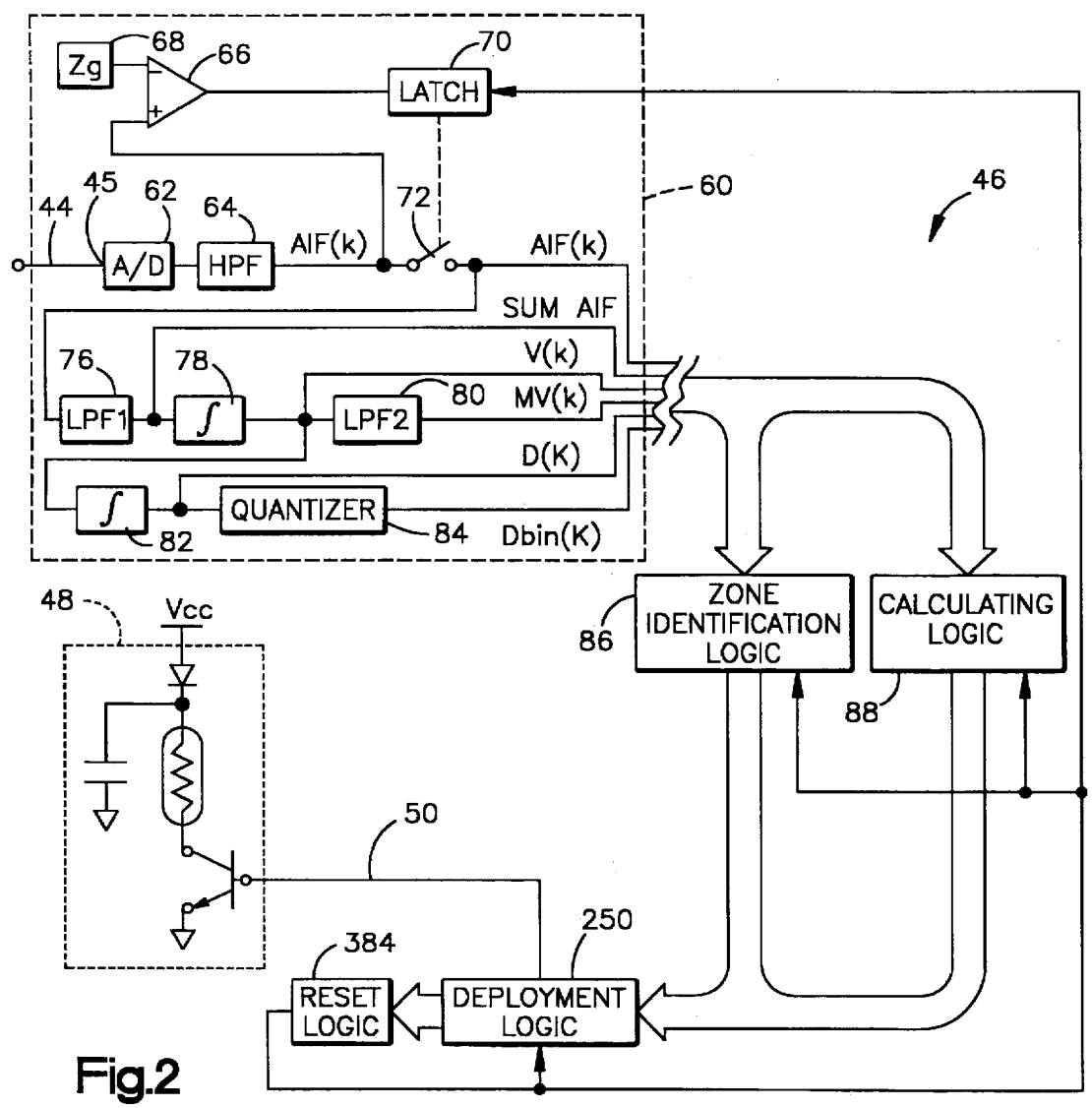
FIG. 2 is a block diagram of the logic functions executed by the controller shown in FIG. 1.

Referring to FIG. 2, the controller 46, shown in functional block diagram form, is preferably a microcomputer. One skilled in the art will realize that the functions preformed by the microcomputer could be embodied using discrete electronic circuitry including digital logic gates. As mentioned, the output 44 of the acceleration sensor 42 is connected to input 45 of an A/D converter 62. The output of the A/D converter 62 is connected with a signal processing logic function 60.

In known air bag control systems, a value, such as the value of crash velocity, is determined in response to the acceleration signal. A crash metric is performed on the determined value to determine if a deployment crash condition is occurring. For example, a determination is made as to whether the crash velocity value exceeds a predetermined threshold value. If this is the only crash metric, the system is considered to have a single crash criteria. In accordance with the present invention, a plurality of criteria are considered. Crash criteria are broken up into crash criteria zones. Each crash criteria zone has associated crash criteria that is used to determine if a deployment crash condition is occurring. A criteria zone in which it is possible to deploy the restraining device is referred to as a deployment control zone. A criteria zone in which it is not possible to deploy the restraining device is referred to as a non-deployment control zone. Typically, a control arrangement will have a plurality of deployment control zones and one non-deployment control zone. The acceleration metric values are used to select one of the plurality of criteria zones.

The signal processing logic 60 performs a plurality of acceleration metrics on the acceleration signal to establish a plurality of acceleration metric values. These acceleration metric values are used for two purposes. First, the acceleration metric values are used to determine into which one of the plurality of crash deployment criteria zones the crash event falls. Second, acceleration metric values are used to determine crash metric values. A determination is then made as to whether a crash metric value indicates that a deployment crash condition is occurring when the crash metric value is evaluated in accordance with the determined criteria zone.

The A/D conversion function 62 of the controller 46 samples the filtered acceleration signal 44 and performs an A/D conversion on that sample. The A/D conversion function 62 provides a digital signal having an acceleration value corresponding to the analog sample value of the filtered digital acceleration signal 44 at a given instant in time.

The sampling rate of the A/D conversion function 62 is defined by a given number of A/D conversions performed per second. The sample rate must be sufficient so that the digital accelerations provided by the A/D conversion function 62 are an accurate representation of the acceleration signal 44.

The output of the A/D converter 62 is filtered by a high pass filter 64. The high pass filter 64 provides a filtered digital acceleration value referred to as "AIF(k)". The letter "k" is an index indicating the high pass filtered acceleration value at that particular time. The current filtered digital acceleration value is designated "AIF(k)". The previous value is designated "AIF(k−1)" and the next value will be "AIF(k+1)". The purpose of the high pass filter 64 is to remove any DC component present in the converted acceleration value from the A/D converter function 62. DC drift can occur, for example, when the acceleration sensor 40 is subjected to temperature variations.

A comparison function 66 compares the filtered digital acceleration AIF(k) against a predetermined threshold value 68 referred to as Zg. In a preferred embodiment, the threshold value 68 equals an acceleration value of 2 g's, where g=9.8 meters/sec$^2$, i.e., the value of gravitation acceleration. The comparison function 66 provides a digital HIGH output when the filtered digital acceleration value AIF(k) is greater than the predetermined threshold value 68. If the value of the filtered acceleration AIF(k) is less than the predetermined threshold value 68, the comparison function 66 provides a digital LOW output.

A latch 70 monitors the output of the comparison function 66 and is latched to an ON condition when a digital HIGH is output from comparator 66, i.e., when the value of the filtered digital acceleration AIF(k) is greater than the threshold 68. A normally open switch 72 is controlled by latch 70. The switch 72 is closed when the latch 70 is latched ON. When the switch 72 is closed, the filtered digital acceleration AIF(k) is passed for further processing by the signal processing logic 60. Those skilled in the art will appreciate that the filtered digital acceleration AIF(k) is not processed by the remaining signal processing logic 60 until the acceleration value is equal to or greater than 2 g's.

The latch 70 is further connected to reset logic 74. Once latched 70 ON, the switch 72 remains closed until reset by reset logic 74. This is true even though subsequent values for the filtered digital acceleration AIF(k) are less than the threshold value 68. Once the latch 70 is latched ON and the switch 72 is closed, the filtered digital acceleration AIF(k) is further processed by the remainder of the processing logic 60.

When the switch 72 is closed, the acceleration signal AIF(k) is connected to a first low pass filter 76. The first low pass filter 76 determines a moving summation value of the filtered digital acceleration AIF(k) designated as "SUM AIF.". The moving summation value SUM AIF is the sum of the last n successive values of the filtered digital acceleration AIF(k). Each of the last n values of the filtered digital acceleration AIF(k) are stored in an internal memory in the microcomputer. In a preferred embodiment, n equals four. Therefore, the value of SUM AIF is equal to AIF(k)+AIF(k−1)+AIF(k−2)+AIF(k−3) and the values of AIF(k) through AIF(k−3) are stored in memory.

A signal indicative of the moving sum SUM AIF is connected to an integrator 78. The integrator 78 is used to determine a crash velocity value (designated V(k)) from the moving sum SUM AIF value. The crash velocity value V(k) is determined by taking the average of the last n values of the filtered digital acceleration (SUM AIF/n) and adding this determined average value to a previously determined crash velocity value (V(k−1)). In accordance with a preferred embodiment where n equals 4, the crash velocity V(k) equals V(k−1)+(SUM AIF)/4.

The crash velocity value V(k) is connected to a second LOW pass filter function 80. The second LOW pass filter function 80 is used to determine a moving average (designated as "MV(k)") of the crash velocity. To make this determination, the second low pass filter 80 stores a predetermined number of successive crash velocity values V(k) in memory and determines a moving average velocity value MV(k) of the crash velocity V(k) from those stored values. In a preferred embodiment, the second LOW pass filter 80 determines an eight point moving average of the crash velocity V(k). The moving average velocity value MV(k) of the crash velocity V(k) then equals (V(k)+V(k−1)+V(k−2)+V(k−3)+V(k−4)+V(k−5)+V(k−6)+V(k−7))/8.

The crash velocity value V(k), determined by the integrator 78, is also connected to an integration function 82. The integration function 82 is used to determine a crash displacement value designated "D(k)". This crash displacement value D(k) is determined by summing the crash velocity V(k) with the value of the crash displacement previously determined, i.e., (D(k−1)). In other words, the crash displacement value D(k) equals D(k−1)+V(k).

The crash displacement value D(k) is connected to a functional device referred to herein as "quantizer 84". The quantizer 84 determines a displacement bin value (designated "Dbin(k)") from the crash displacement value D(k). As used herein, the term "bin" is used in the sense meaning "box". Displacement bins are defined by a range of crash displacement values. Therefore, the displacement bin value Dbin(k) identifies into which one of a plurality of displacement bins the displacement value D(k) falls. The crash displacement bin value Dbin(k) is the integer that, if all bins are of equal size, results from dividing the crash displacement value D(k) by the size of a crash displacement bin Dbin(k). The size of a crash displacement bin is, in that case, the magnitude of the range of crash displacement values associated with each displacement bin Dbin.

Each of the values AIF(k), SUM AIF(k), MV(k), V(k), D(k), and Dbin(k) are acceleration metric values that are determined by the signal processing logic 60 in response to the acceleration signal 44. These acceleration metric values are used by the zone identification logic 86 to determine into which one of a plurality of criteria zones a crash event falls. Calculating logic 88 is used to establish crash metric values in response to the values of the acceleration metric values. The zone identification logic 86 and calculating logic 88 are preferably implemented in the controller 46 in accordance with the process described below.

Figure 3:
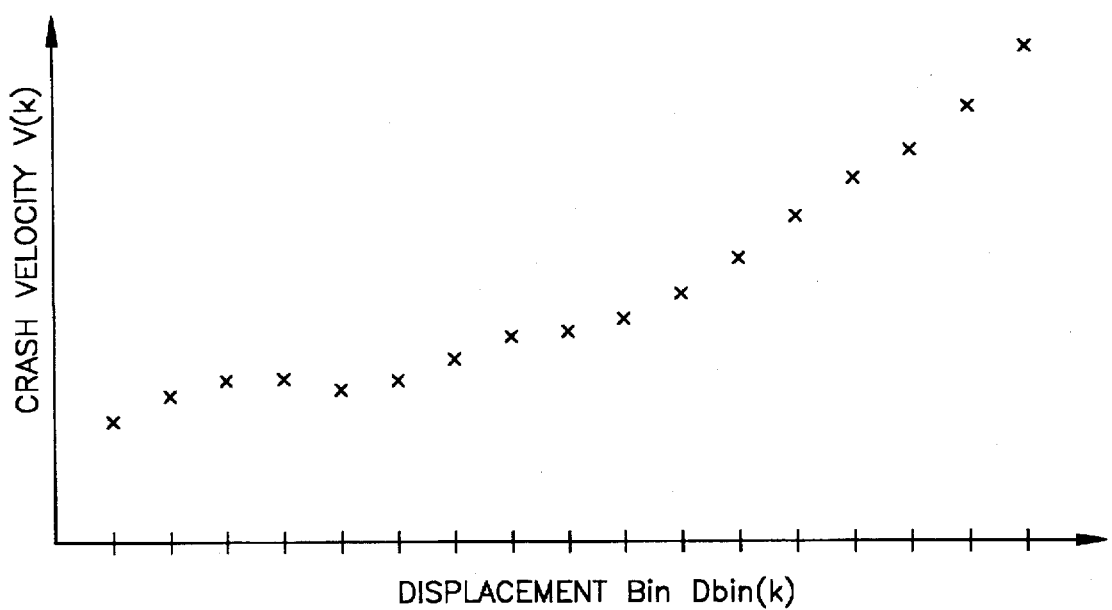
FIG. 3 is a graph of crash velocity as a function of crash displacement for a hypothetical crash condition.

Referring to FIG. 3, a graph of the crash velocity V(k) versus the displacement bin Dbin(k) for a hypothetical crash event. The purpose of this graph is to show the shape of a curve that one might expect during a crash event. The horizontal and vertical axes represent the possible values of variables representing displacement bins Dbin(k) and crash velocity values V(k), respectively. Each "x" denotes a point P defined by a displacement bin coordinate value and a crash velocity coordinate value that was determined by the signal processing logic 60 for a given k value. Each point on the graph may be designated using nomenclature of the form P[Dbin(k), V(k)]. Such a curve, as depicted in FIG. 3, is referred to herein as a displacement-velocity curve or DV curve.

Figure 4:
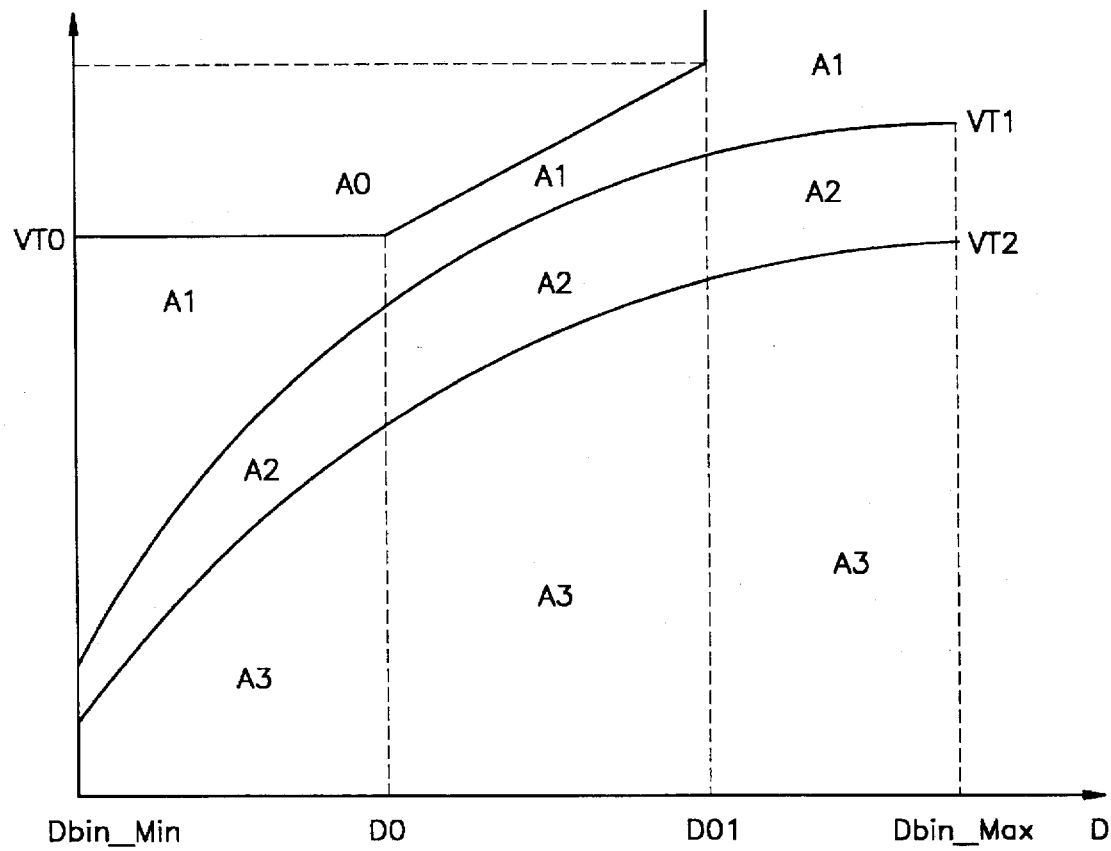
FIG. 4 is a graph showing a plurality of deployment zones.

FIG. 4 is a graph illustrating three deployment criteria zones A0, A1, and A2. Zone A3 is typically a no-deployment zone. Also, A0 is typically an always deployment zone. Each of the deployment criteria zones has an associated area defined by borders or curves of crash velocity values as a function of displacement bin values. These borders establish a range of values between velocity and displacement. A first deployment criteria zone A0 is defined by curve border having a velocity value VT0 which is constant from Dbin min to D0, monotonically increasing from D0 to D01, and infinitely increasing at D01. The shape of the border curve is empirically determined for the, particular vehicle platform of interest and is stored in an internal memory in the controller 46. When a point P[Dbin(k),V(k)] on the DV curve has a displacement bin coordinate that is greater than or equal to Dbin Min and less than or equal to D01, and also has a crash velocity coordinate that is greater than or equal to velocity value defined by the curve VT0, that crash event is then evaluated in accordance with crash criteria associated with the crash criteria of zone A0.

The deployment criteria zone A1 is defined by the border curve VT0 and a curve VT1. The curve VT1 is empirically determined for the particular vehicle platform of interest. The velocity threshold VT1 is functionally related to the displacement bin Dbin(k). For each displacement bin Dbin (k) between the threshold Dbin Min and Dbin Max, an associated value for VT1 is stored in the memory of the controller 46. When a point P[Dbin(k), V(k)] on the DV curve has a displacement bin value and a velocity value that falls between the curves VT0 and VT1, the crash event is evaluated in accordance with crash criteria associated with the zone A1.

The deployment criteria zone A2 is defined by the border curve VT1 and a curve VT2. The curve VT2 is empirically determined for the particular vehicle platform of interest. The velocity threshold VT2 is functionally related to the displacement bin Dbin(k). For each displacement bin Dbin (k) between the threshold Dbin Min and Dbin Max, an associated value for VT2 is stored in the memory of the controller 46. When a point P[Dbin(k), V(k)] on the DV curve has a displacement bin value and a velocity value that falls between the curves VT1 and VT2, the crash event is evaluated in accordance with crash criteria associated with the zone A2.

The deployment criteria zone A3 is defined as the area under the border curve VT2. When a point P[Dbin(k), V(k)]

on the DV curve has a displacement bin value and a velocity value that falls below curve VT2, the crash event is evaluated in accordance with crash criteria associated with the crash criteria of zone A3.

The zone identification logic 86 determines which of the deployment criteria zones shown in FIG. 4 contains the DV Curve. In other words, the zone identification logic 86 determines which one of the plurality of deployment criteria zones contains the presently determined value or a point P[Dbin(k),V(k)] on the DV curve. The zones A0–A3 are priority ranked so that A0 is considered the highest zone and A3 is considered the lowest zone. The zone default is to the lowest zone A3. Once the DV curve has a point P in a zone higher than A3, a zone flag internal to the controller 46 is set to that higher zone level. The deployment criteria for determining whether to deploy or actuate the restraint system is that deployment criteria associated with the highest criteria zone in which a point P was found to have fallen.

Figure 5:
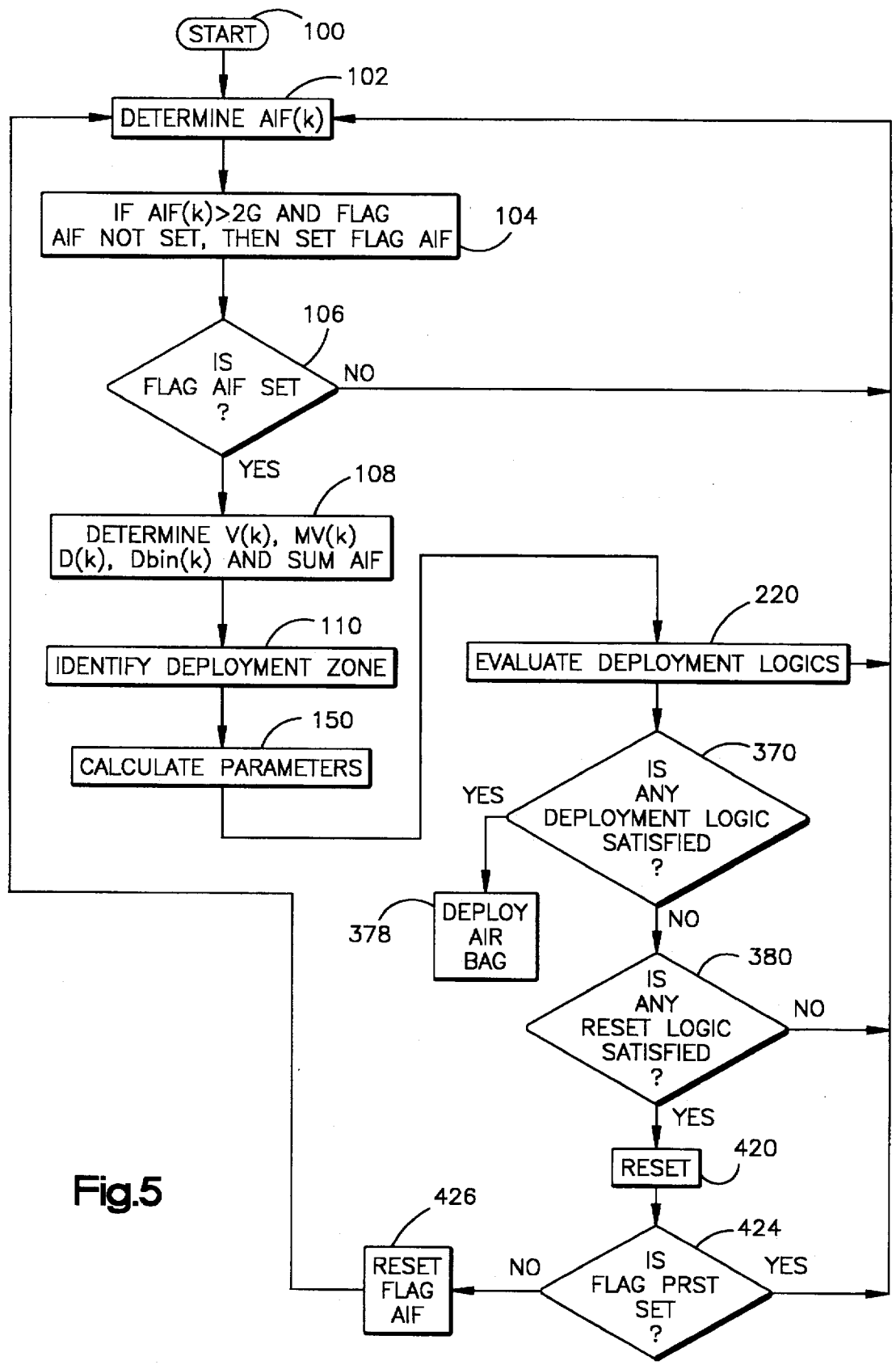
FIG. 5 is a flow chart depicting the main control process of the present invention.

Referring to the flow chart of FIG. 5, the control process followed by the controller 46 will be better understood. FIG. 5 is a flow chart of the main loop program performed by controller 46. In step 100, performed upon initial start-up, preliminary initialization of the microcomputer is performed. This initialization includes such tasks as clearing internal memories, setting flags to initial conditions, etc. In step 102, the filtered acceleration signal 44 is sampled and a low-pass filtered digital acceleration value AIF(k) is determined. From step 102, the process goes to step 104 where a flag FLAG AIF in the controller 46 is set if: 1)FLAG AIF is not already set; and 2)the filtered digital acceleration AIF(k) is greater than the threshold 48 (2 g). Initially, FLAG AIF is set to a negative condition in the initialization step 100. The process then proceeds to step 106.

In step 106, a determination is made as to whether the flag FLAG AIF is set. If the determination in step 106 is negative, meaning that the flag FLAG AIF is not set, the process loops back to step 102. The process remains in the loop of steps 102, 104, 106 until the value of AIF is greater than 2 g's.

If the determination in step 106 is affirmative, indicating the flag FLAG AIF is set, the process goes to step 108 where the crash velocity V(k), moving average of the crash velocity MV(k), crash displacement D(k), displacement bin Dbin (k), and moving sum of the acceleration SUM AIF are determined as described above. The determined values are stored in memory for later use. The process then proceeds to step 110 where the zone identification routine (corresponding in function to block 86 of FIG. 2) identifies the current criteria zone and remembers the highest deployment criteria zone so far encountered in the present crash event. In the initialization step 100, the criteria zone is set to the lowest level as a default condition, e.g., A3.

Figure 6:
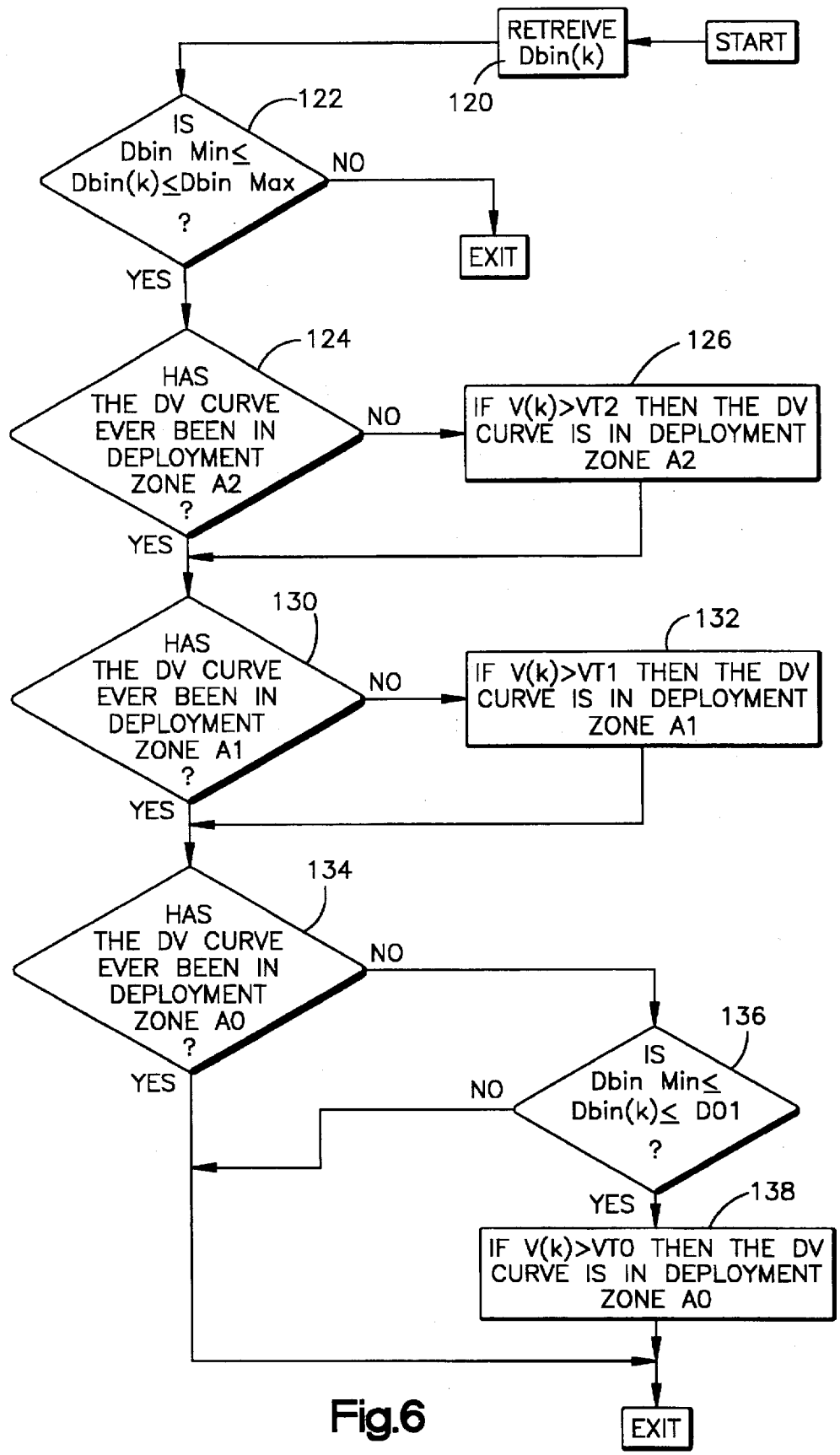
FIG. 6 is a flow chart illustrating details of a control step shown in FIG. 5.

The zone identification routine is shown in FIG. 6. The process starts with step 120 where the value Dbin(k) is retrieved from memory. The process then proceeds to step 122 where it is determined whether the displacement bin value Dbin(k) is within the displacement bin window between Dbin Min and Dbin Max. If the determination in step 122 is negative, the routine exits to the next step of the main loop (step 150, FIG. 5). In this way, the zone identification logic 86 proceeds further with a determination of the deployment criteria zone only when the displacement bin Dbin(k) is within the displacement bin window of Dbin Min and Dbin Max.

If the determination in step 122 is affirmative, the process continues with step 124. Recall that in the initialization step 100 the deployment criteria zone was set to a default of A3. In step 124, a determination is made as to whether the DV Curve or, more specifically, whether any point P[Dbin(k),V (k)] (referred to hereinafter as "P") on that curve, has ever been in the deployment criteria zone A2. The purpose of this step and the remainder of the steps of FIG. 6 is to set the zone criteria flag to the highest level in which P has fallen. The first time through the process of FIG. 6, the determination in step 124 is negative. If the determination in step 124 is negative, the process proceeds to step 126. In step 126, it is determined whether the DV Curve is in the deployment criteria zone A2. The DV Curve is in the deployment criteria zone A2 when the crash velocity coordinate of the current point P[Dbin(k),V(k)] on that curve is greater than the velocity value VT2 for that displacement value. If V(k) is greater than VT2, the criteria zone flag is set to A2. From step 126, or when the determination in step 124 is affirmative, the process proceeds to step 130.

In step 130, a determination is made as to whether the DV Curve has ever been in the deployment criteria zone A1. Initially, this determination is negative. Before the DV value can be in zone A1, it must first be in zone A2. If the determination in step 130 is negative, the process proceeds to step 132. In step 132, it is determined whether the DV Curve is in the deployment criteria zone A1. The DV Curve is in the deployment criteria zone A1 when the crash velocity coordinate of the current point P[Dbin(k),V(k)] on that curve is greater than the velocity value VT1. If V(k) is greater than VT1, the criteria zone flag is set equal to A1. From step 132, or when the determination in step 130 is affirmative, the process proceeds to step 134.

In step 134, a determination is made whether the DV Curve has ever been in the deployment criteria zone A0. A0 is the highest criteria zone. To get to A0, the DV curve has to go through A2 and A1. If the determination in step 134 is negative, the process proceeds to step 136. In step 136, it is determined whether the displacement bin Dbin(k) is within the displacement bin window between Dbin Min and D01. When the determination in step 136 is affirmative, the process proceeds to step 138.

In step 138, a determination is made as to whether the DV Curve is in the deployment criteria zone A0, i.e., whether the crash velocity coordinate of the current point P[Dbin(k),V (k)] on that curve is greater than the velocity value VT0. If V(k) is greater than VT0, the criteria zone flag is set equal to A0. From step 138 or when the determination in either step 134 or step 136 is negative, the process proceeds to the next step 150 of the main loop.

Any determination of a value P[Dbin(k),V(k)] is referred to herein as simply a point P. Since the value of a point P can not get to zone A0 before going through both A2 and A1, and can not get to A1 without going through A2, it should be appreciated that the criteria zone flag will always be set to its highest value and can not be set to a lower value by the value of P dropping back to a lower zone. For example, once the zone is set to A0, the determinations in steps 124 and 130 will thereafter be affirmative thereby preventing the criteria zone flag being set to a lower value in steps 126, 132.

Referring back to FIG. 5, the process proceeds from step 110 to step 150 where the calculating routine (corresponding in function to block 88 of FIG. 2) determines a plurality of parameter characteristics of the DV curve. Referring to FIGS. 7 through 10, routines used to determine these parameter characteristic values will be better appreciated. The parameter characteristic values determined by the calculating routines shown in FIGS. 8 and 10 include (i) maximum and minimum P values occurring within predetermined zones, and (ii) slopes within displacement windows.

Figure 7:
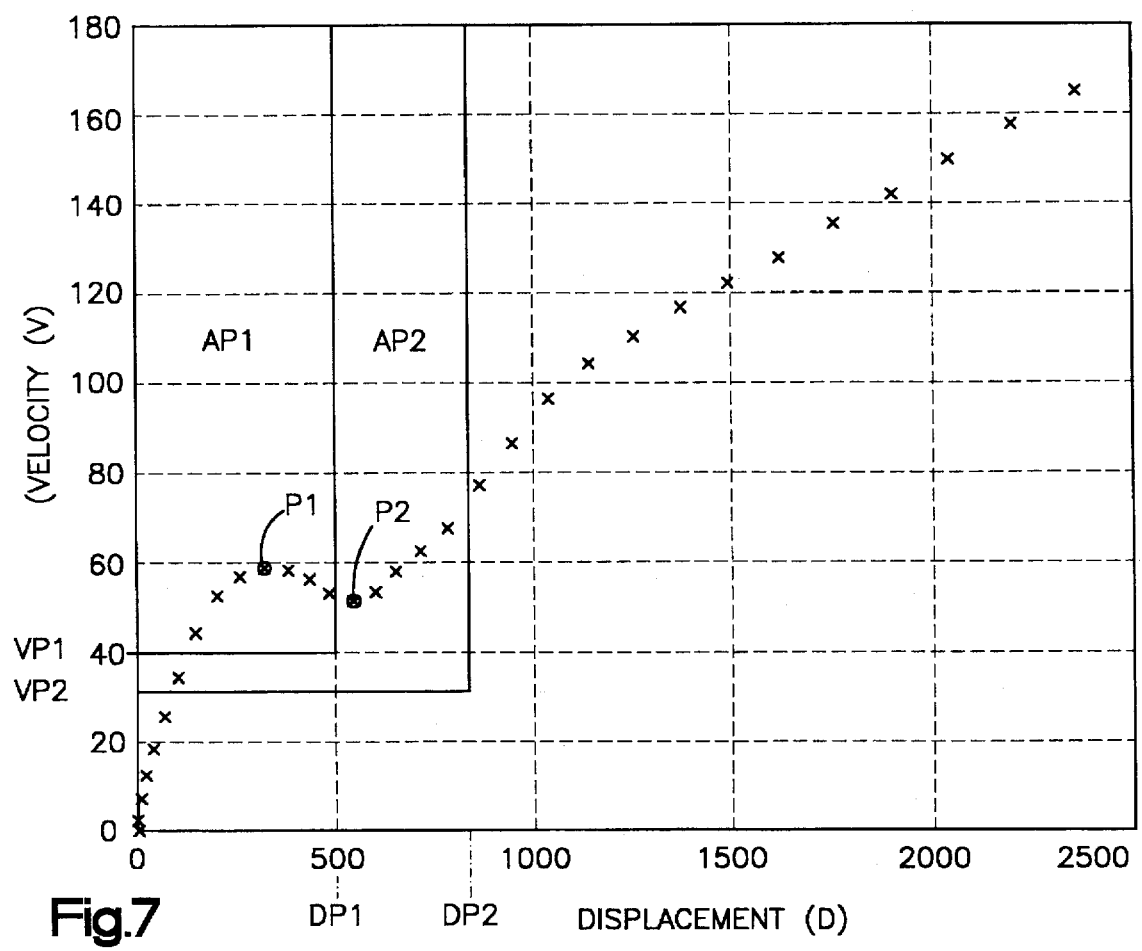
FIG. 7 is a graphical illustration of a parameter determined in the control process shown in FIG. 8.

In FIG. 7, a local maximum P1 and a local minimum P2 of a DV Curve are shown. The local maximum P1 is the first maximum of the DV curve, i.e., a data point before which data values were increasing up to that point and thereafter decreasing. The local minimum P2 is the first minimum of the DV curve, i.e., a data point before which data values were decreasing down to that point and thereafter increasing. Two zones, AP1 and AP2 are also shown on the graph. The calculating routine determines as a first parameter whether the local maximum P1 is within the zone AP1 and whether the local minimum P2 is within the zone AP2.

Figure 8:
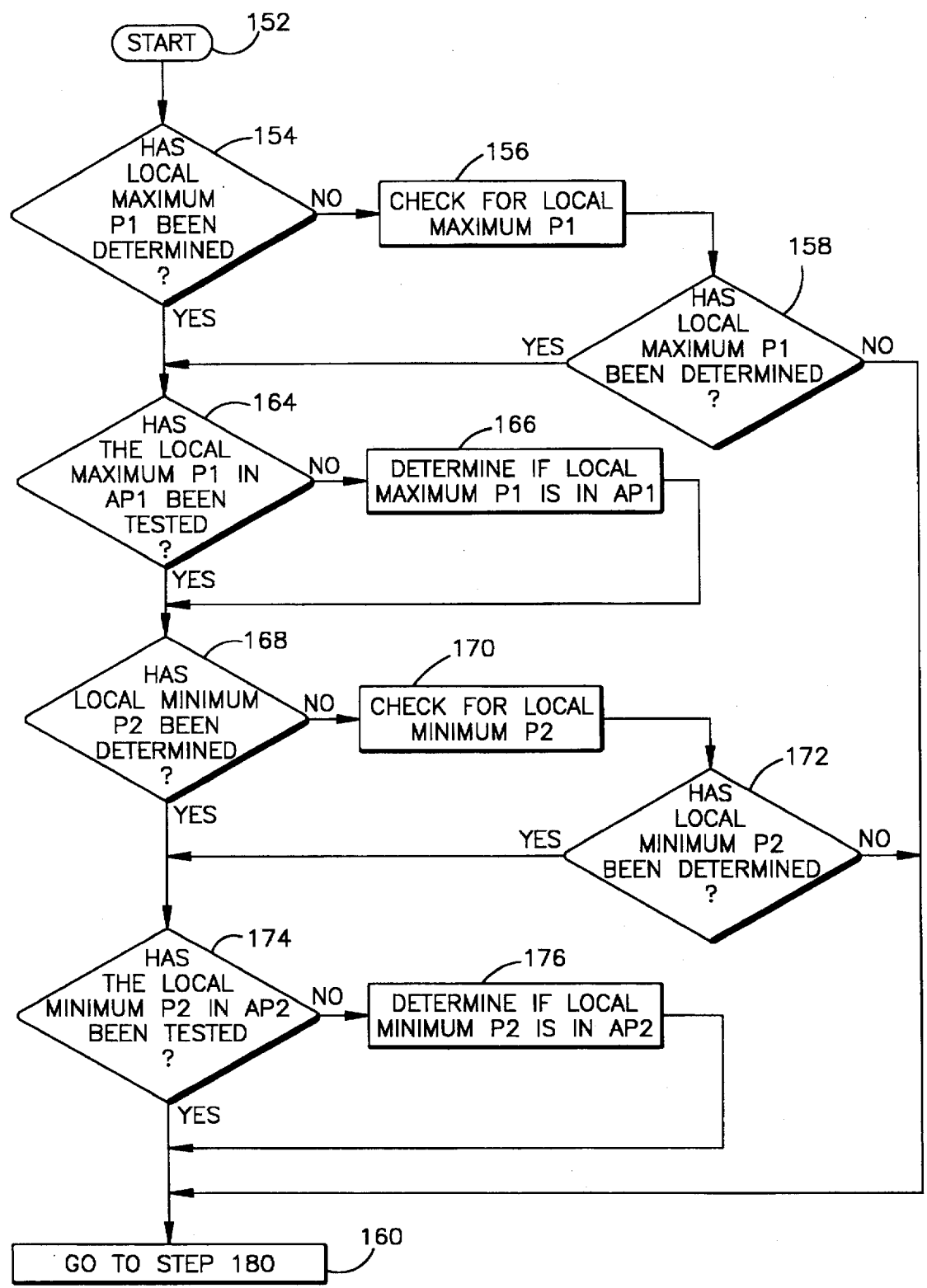
FIG. 8 is a flow chart illustrating details of a control step shown in FIG. 5.

FIG. 8 is a flow chart of part of the process 150 executed by the calculating routine to determine parameters and, in particular, the local maximum P1 and the local minimum P2. The process is entered at 152 and proceeds to step 154 where it is determined whether the local maximum P1 has been determined. If the determination in step 154 is negative, the routine proceeds to step 156.

In step 156, the last three successive points on the DV curve are checked to see if they straddle a local maximum P1. The last three successive points on the DV curve are denoted P[Dbin(k),V(k)], P[Dbin(k-1),V(k-1)], and P[Dbin(k-2),V(k-2)]. The local maximum P1 exists when V(k) is less than V(k-1) and V(k-1) is greater than V(k-2). From step 156, the process proceeds to step 158.

In step 158, it is determined whether a local maximum P1 was found in step 156. If a local maximum P1 was not found, the process proceeds to step 160. In step 160, the process continues with the slope calculation routine shown in FIG. 10. When step 158 determines that the local maximum P1 has been determined, i.e., the determination in step 158 is affirmative, the process proceeds to step 164.

In step 164, it is determined whether the local maximum P1 has been tested to see if it is within the zone AP1. If the determination in step 164 is negative, the process proceeds to step 166. In step 166, it is determined whether the local maximum P1 is within the zone AP1. The zone AP1 is defined by the crash displacement window from 0 to a displacement value DP1, and by a constant velocity value VP1. The local maximum P1 is within the zone AP1 when its crash displacement coordinate is greater than or equal to zero and less than or equal to the threshold DP1, and its crash velocity coordinate is greater than or equal to the velocity value VP1. From step 166, or an affirmative determination in step 164, the process proceeds to step 168.

In step 168, it is determined whether the local minimum P2 has been determined. If the determination in step 168 is negative, the process proceeds to step 170. In step 170, the last three successive points on the DV curve are checked to see if they straddle a local minimum P2. The last three successive points on the DV curve are denoted P[Dbin(k), V(k)], P[Dbin(k-1),V(k-1)], and P[Dbin(k-2), V(k-2)]. The local minimum P2 exists when V(k) is greater than V(k-1) and V(k-2) is greater than V(k-1). From step 170, the process proceeds to step 172.

In step 172, it is determined whether a local minimum P2 was found in step 170. If the local minimum P2 has not been found, the process proceeds to step 160 where the process returns to the main loop. When step 172 determines that a local minimum P2 was found, or when the determination in step 168 is positive, the process proceeds to step 174.

In step 174, it is determined whether the local minimum P2 has been tested to see if it is within the zone AP2. If the determination in step 174 is negative, the process proceeds to step 176. In step 176, it is determined whether the local minimum P2 is within the zone AP2. The zone AP2 is defined by the crash displacement window from 0 to a threshold DP2, and by a constant velocity threshold VP2. The local minimum P2 is within the zone AP2 when its crash displacement coordinate is greater than or equal to zero and less than or equal to the threshold DP2, and its crash velocity coordinate is greater than or equal to the velocity threshold VP2. From step 176, or when the determination in step 174 is affirmative, the process proceeds to step 160 where the process continues with the slope calculation routine shown in FIG. 10.

Figure 9:
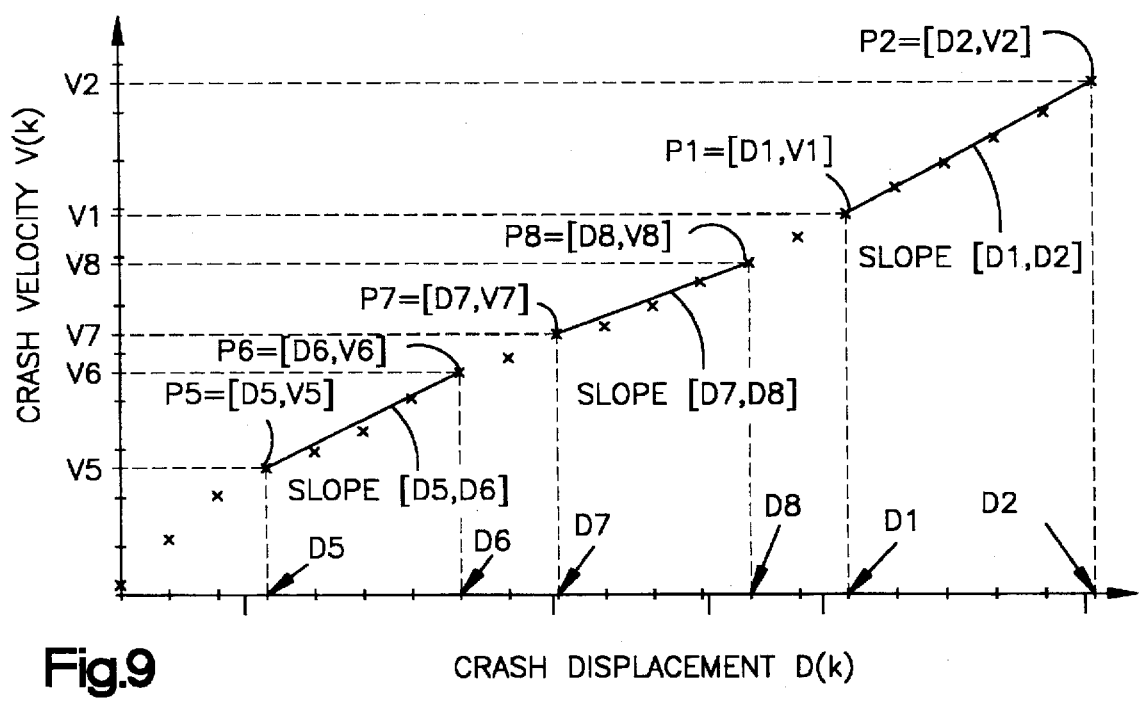
FIGS. 9 is a graphical illustration of a parameter determined in the control process shown in FIG. 10.

FIG. 9 is a DV Curve showing a plurality of crash displacement windows defined on the crash displacement axis. A plurality of displacement window defining values D1', D2', D3' D4', D5', D6', D7', and D8' are preselected based on a vehicle platform. Each crash displacement window is defined by two associated displacement values. A first crash displacement window for slope determination purposes is defined by two displacement values D5 and D6 just greater than D5' and D6', respectfully. Second and third crash displacement windows are defined by the displacement values D7 and D8 just greater than D7' and D8', and the displacement values D1 and D2 just greater than D1' and D2', respectively. The displacement calibration or window defining values D5', D6', D7', D8', D1' and D2' are determined empirically for the particular vehicle platform of interest and are stored in memory in the controller 46.

The calculating logic 88 determines the average slope of the DV Curve over each of the crash displacement windows in FIG. 9. The average slope of the DV Curve over the crash displacement window for D5 and D6 is denoted Slope[D5, D6]. The Slope[D5,D6] is determined from the coordinates of the points P5 and P6 using the equation (V6−V5)/(D6−D5). The Slope[D7,D8] is determined from the coordinates of the points P7 and P8 using the equation (V8−V7)/(D8−D7). Similarly, Slope[D1,D2] is determined from the coordinates of the points P1 and P2 using the equation (V2−V1)/(D2−D1).

Figure 10:
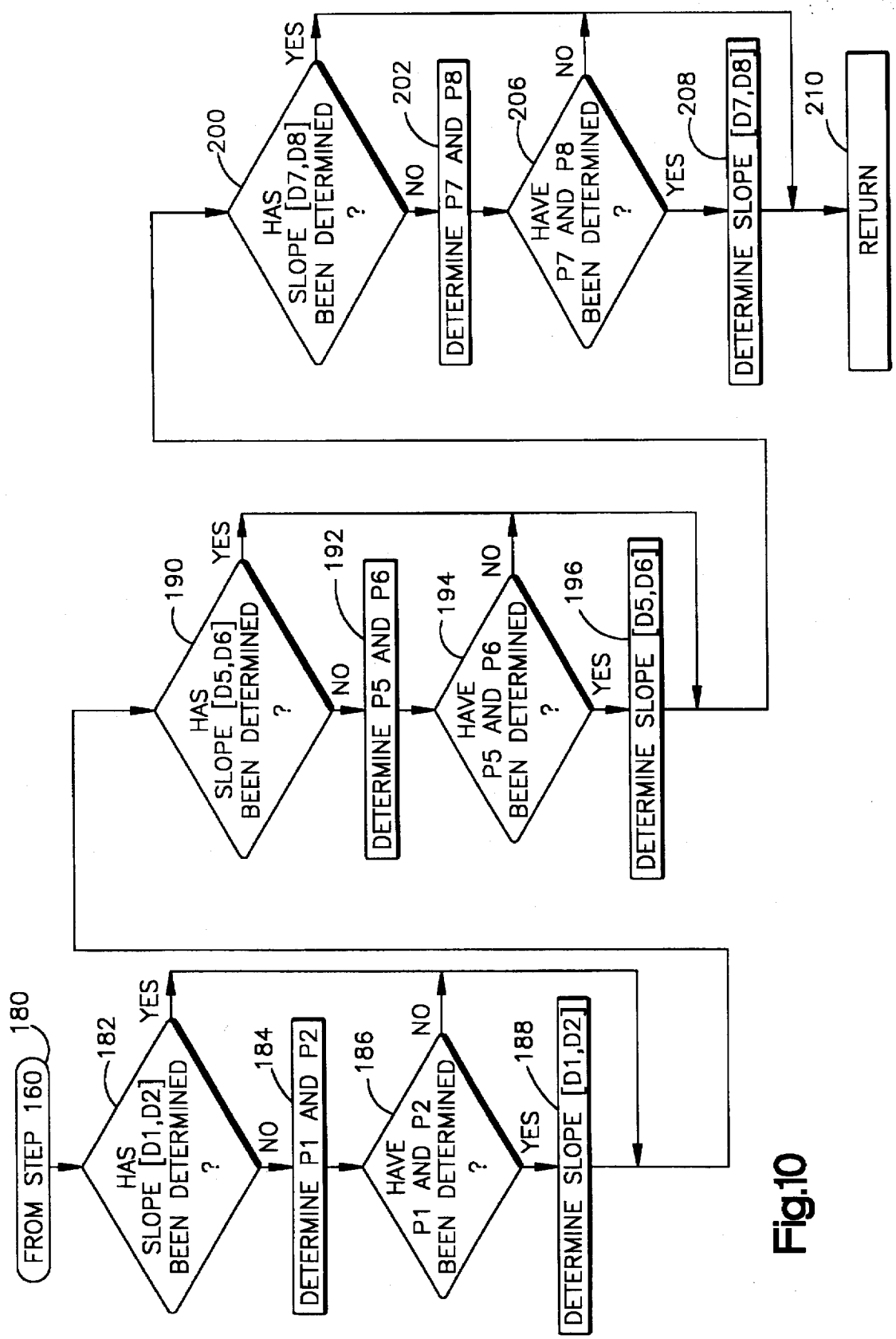
FIG. 10 is a flow chart illustrating details of a control step shown in FIG. 5.

FIG. 10 is a flow chart of the process executed by the calculating logic 88 to determine the average slopes. The process is entered at step 180 upon completion of the routine shown in FIG. 8 and proceeds to step 182. In step 182 it is determined whether the Slope[D1,D2] has already been determined. If the determination in step 182 is negative, the process proceeds to step 184.

In step 184, the coordinates of the points P1 and P2 on the DV Curve are determined. The coordinates of the points P1 and P2 are used to calculate the Slope[D1,D2]. The point P1 is the first point on the DV Curve with a crash displacement coordinate greater than or equal to the threshold D1'. The point P2 is the first point on the DV Curve with a crash displacement coordinate greater than or equal to the threshold D2'. From step 184, the process proceeds to step 186.

The data points on the DV curve are acquired one after another as the crash event proceeds. Thus, upon the first pass through the routine of FIG. 10, it is likely that data points P1 and P2 will not yet be available. In this case, points P1 and P2 will not be determined in step 184. In step 186, it is determined whether the points P1 and P2 have been determined. If both points P1 and P2 have been determined, the process proceeds to step 188. In step 188 the Slope[D1,D2] is determined from the coordinates of the points P1 and P2 using the equation (V2−V1)/(D2−D1). The value of the Slope[D1,D2] is stored in memory. The process then proceeds to step 190 from either step 188 or an affirmative determination in step 182 or a negative determination in step 186.

In step 190, it is determined whether the Slope[D5,D6] has already been determined. If the determination in step 190 is negative, the process proceeds to step 192. In step 192, the coordinates of the points P5 and P6 on the DV Curve are determined. The coordinates of the points P5 and P6 are used to calculate the Slope[D5,D6]. The point P5 is the first point on the DV Curve with a crash displacement coordinate greater than or equal to the value D5'. The point P6 is the first point on the DV Curve with a crash displacement coordinate greater than or equal to the value D6'. From step 192, the process proceeds to step 194.

In step 194 (which is similar to step 186 in purpose), it is determined whether the points P5 and P6 have been determined. If both points P5 and P6 have been determined, the process proceeds to step 196. In step 196, the Slope[D5,D6] is determined from the coordinates of the points P5 and P6 using the equation (V6−V5)/(D6−D5). The value of the Slope[D5,D6] is stored in memory. From step 196, or if the determination in step 190 is affirmative, or the determination in step 194 is negative, the process proceeds to step 200.

In step 200, it is determined whether the Slope[D7,D8] has already been determined. If the determination in step 200 is negative, the process proceeds to step 202. In step 202, the coordinates of the points P7 and P8 on the DV Curve are determined. The coordinates of the points P7 and P8 are used to calculate the Slope[D7,D8]. The point P7 is the first point on the DV Curve with a crash displacement coordinate greater than or equal to the threshold D7'. The point P8 is the first point on the DV Curve with a crash displacement coordinate greater than or equal to the threshold D8'. From step 202, the process proceeds to step 206.

In step 206, it is determined whether the points P7 and P8 have been determined. If both points P7 and P8 have been determined, the process proceeds to step 208. In step 208, the Slope[D7,D8] is determined from the coordinates of the points P7 and P8 using the equation (V8−V7)/(D8−D7). The value of the Slope[D7,D8] is stored in memory. From step 208, or from an affirmative determination in step 200 or a negative determination in step 206, the process proceeds to step 210. In step 210, the process returns back to the main loop shown in FIG. 5, at step 220.

In step 220, the crash metric associated with the identified deployment criteria zone is evaluated using the determined parameter values of step 150. This process is carried out using the deployment routine (functionally corresponding to block 250 of FIG. 2) using the determinations made by the identification routine (FIG. 6) and the calculating routines (FIGS. 8 and 10) to determine whether a crash event is occurring.

Figure 11:
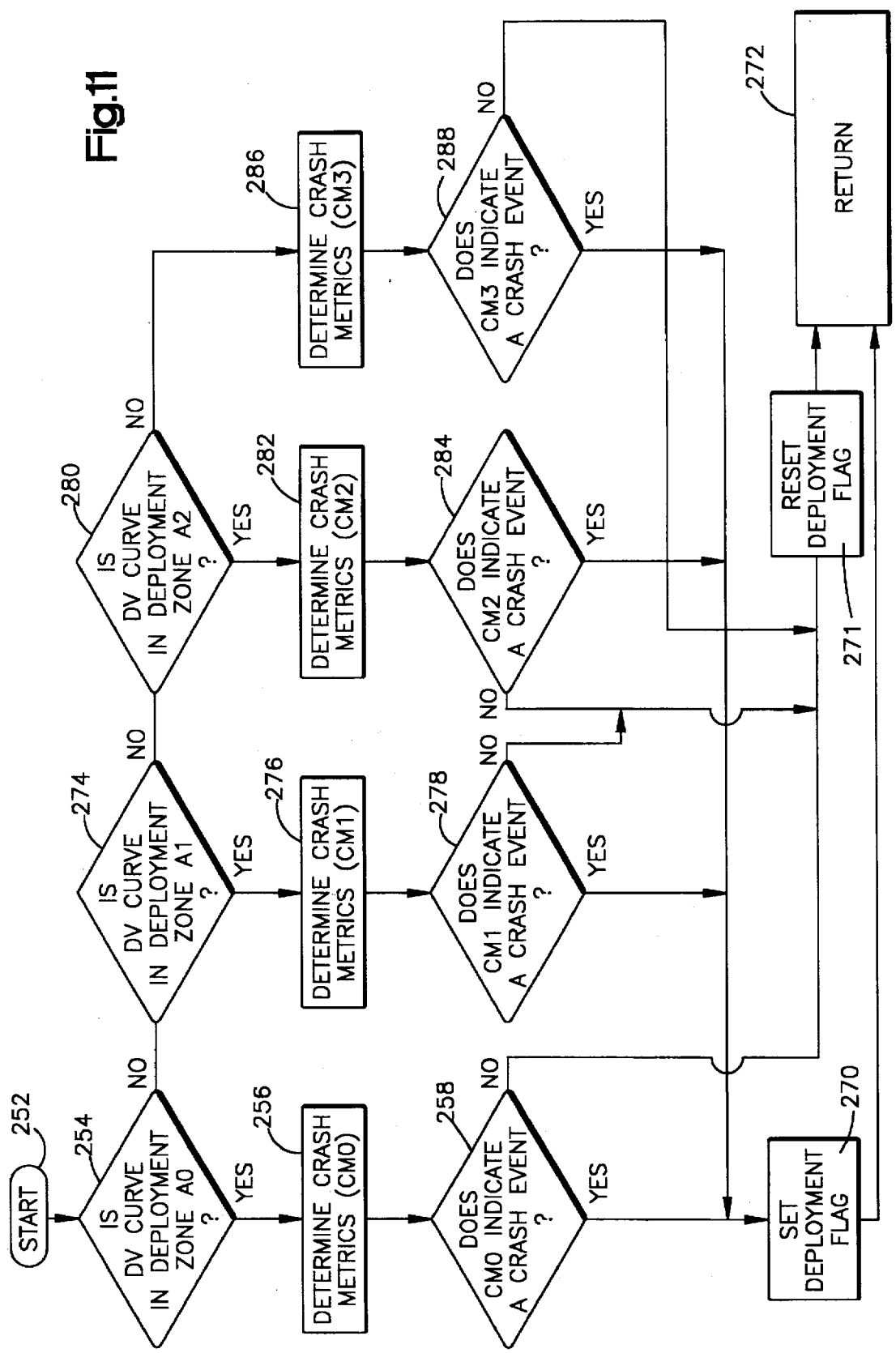
FIG. 11 is a flow chart illustrating details of a control step shown in FIG. 5.

The process executed by the deployment routine 220 is shown in greater detail in FIG. 11. The process is entered at 252 and proceeds to step 254. In step 254, the criterion zone variable is examined to determine whether the DV curve is in or has passed through the deployment criteria zone A0. If the determination in step 254 is affirmative, the process proceeds to step 256. In step 256, a crash metric CM0 is evaluated to determine whether a deployment crash event is occurring. From step 256, the process proceeds to step 258.

In step 258, a determination is made as to whether the crash metric CM0 indicates a deployment crash event is occurring. When it is determined in step 258 that the crash metric CM0 indicates a deployment crash event is occurring, the process proceeds to step 270. In step 270, the air bag deployment flag is set. If the determination in step 258 is negative, the process proceeds to step 271, where the air bag deployment flag is reset, and then to step 272 where the process is returned to step 370 of the main loop shown in FIG. 5.

When the determination in step 254 is negative, meaning that the DV Curve is not in and has not passed through the deployment criteria zone A0, the process proceeds to step 274. In step 274, a determination is made as to whether the DV curve is in or has passed through the deployment criteria zone A1. If the determination in step 274 is affirmative, the DV Curve is in the deployment criteria zone A1, and the process proceeds to step 276. In step 276, a crash metric CM1 is evaluated to determine whether a deployment crash event is occurring. From step 276 the process proceeds to step 278.

In step 278, it is determined whether the crash metric CM1 indicates a deployment crash event is occurring. If the determination in step 278 is affirmative, the process proceeds to step 270 and the air bag deployment flag is set. From step 270, the routine continues with step 272. When the determination in step 278 is negative, the process proceeds to step 271.

When the determination in step 274 is negative, meaning that the DV Curve is not in and has not passed through the deployment criteria zone A1, the process proceeds to step 280. In step 280, a determination is made as to whether the DV curve is in or has passed through the deployment criteria zone A2. If the determination in step 280 is affirmative, the DV Curve is in the deployment criteria zone A2, and the process proceeds to step 282. In step 282, a crash metric CM2 is evaluated to determine whether a deployment crash event is occurring. From step 282, the process proceeds to step 284.

In step 284, it is determined whether the crash metric CM2 indicates a deployment crash event is occurring. If the determination in step 284 is affirmative, the process proceeds to step 270 and to setting of the deployment flag. When the determination in step 284 is negative, the process proceeds to step 271.

When the determination in step 280 is negative, meaning that the DV Curve is not in and has not passed through the deployment criteria zone A2, the process proceeds to step 286. In step 286, the crash metric CM3 is evaluated to determine whether a deployment crash event is occurring. From step 286, the process proceeds to step 288. In step 288, it is determined whether the crash metric CM3 indicates a deployment crash event is occurring. If the determination in step 288 is affirmative, the process proceeds to step 270 and the air bag deployment flag is set. If the determination in step 288 is negative, the process proceeds to step 271.

Figure 12:
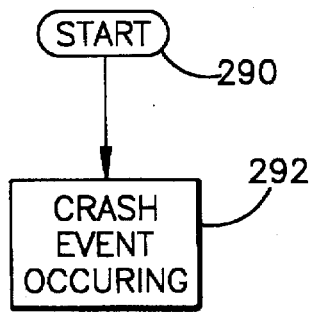
FIGS. 12–16 are flow charts illustrating details of controls steps of FIG. 11.

FIG. 12 is a flow chart of the crash metric CM0 process executed in step 256 to determine whether a deployment crash event is occurring. The process starts in step 290 and proceeds to step 292. In step 292, the fact that the DV curve is in the deployment criteria zone A0 is itself a sufficient indication that a deployment crash event is occurring. A deployment crash event flag is set and the process proceeds directly to the air bag deployment step 270 shown in FIG. 11. No negative decision is available in this case. When the DV curve is in the deployment criteria zone A0, it typically means that a head-on barrier crash event is occurring.

Figure 13:
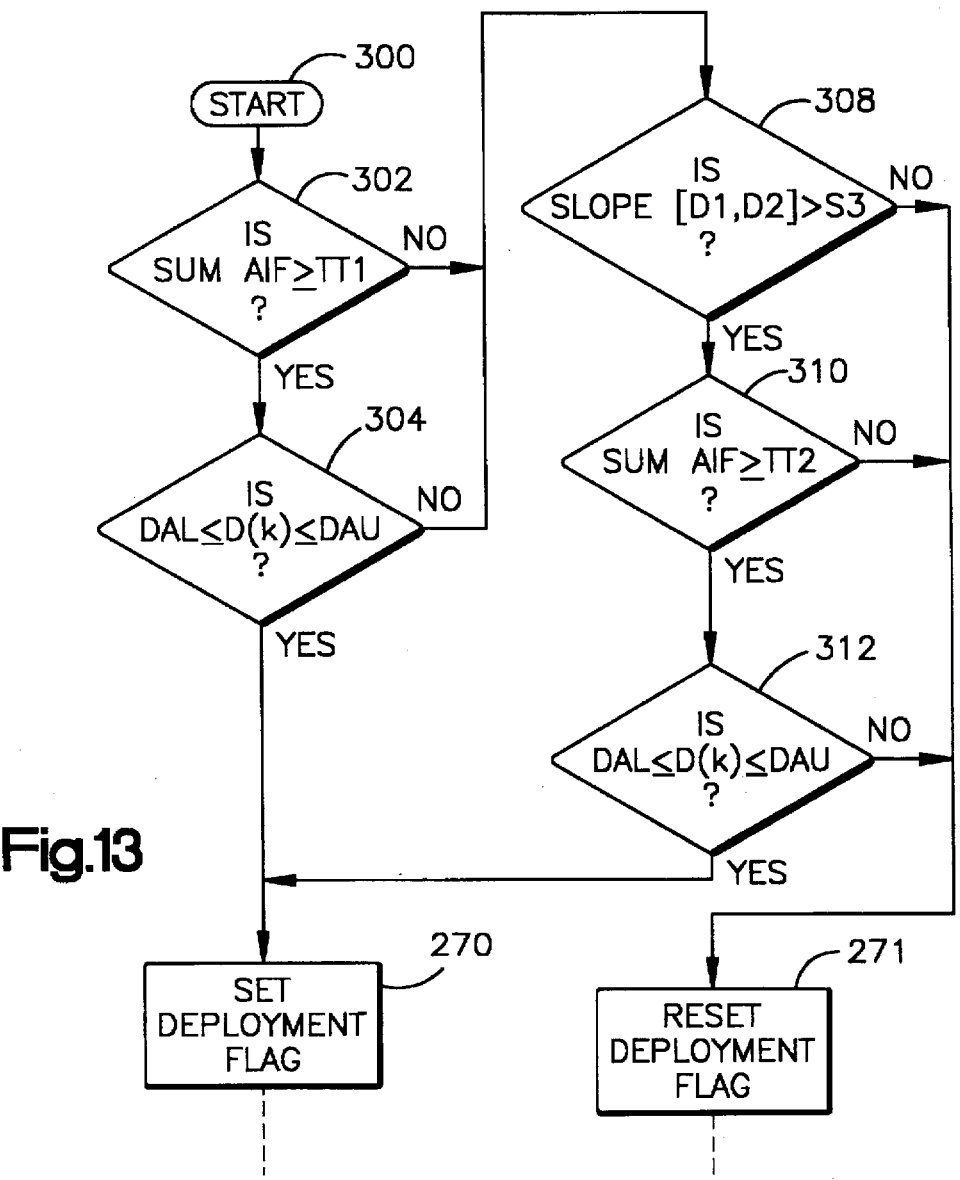

FIG. 13 is a flow chart of the crash metric CM1 process executed in step 276 to determine whether a deployment crash event is occurring. The process starts in step 300 and proceeds to step 302. In step 302, a determination is made as to whether the moving sum SUM AIF is greater than or equal to a threshold TT1 (see FIGS. 19 and 23). When the determination in step 302 is affirmative, the process proceeds to step 304. In step 304, it is determined whether the crash displacement value D(k) is greater than or equal to a threshold DAL and less than or equal to a threshold DAU (see FIGS. 19 and 23). If the determination in step 304 is affirmative, the process proceeds to step 270 (also shown in FIG. 11). In step 270, a deployment crash event flag is set. The process then continues with step 272 as shown in FIG. 11.

When either of the determinations made in steps 302 and 304 is negative, the process proceeds to step 308. In step 308, a determination is made as to whether the Slope[D1, D2] is greater than or equal to a threshold S3. If the determination in step 308 is affirmative, the process proceeds to step 310. In step 310, it is determined whether the moving sum SUM AIF is greater than or equal to a threshold TT2 (see FIG. 20). When the determination in step 310 is affirmative, the process proceeds to step 312. In step 312, a determination is made as to whether the crash displacement D(k) is within the crash displacement window defined by the thresholds DAL and DAU (see FIG. 20). If the determination in step 312 is affirmative, a crash event is occurring and the process proceeds to step 270. If any of the determinations in steps 308, 310 or 312 are negative, the process proceeds to step 271 where the crash event flag is reset. The process then continues with step 272 of FIG. 11.

Figure 14:
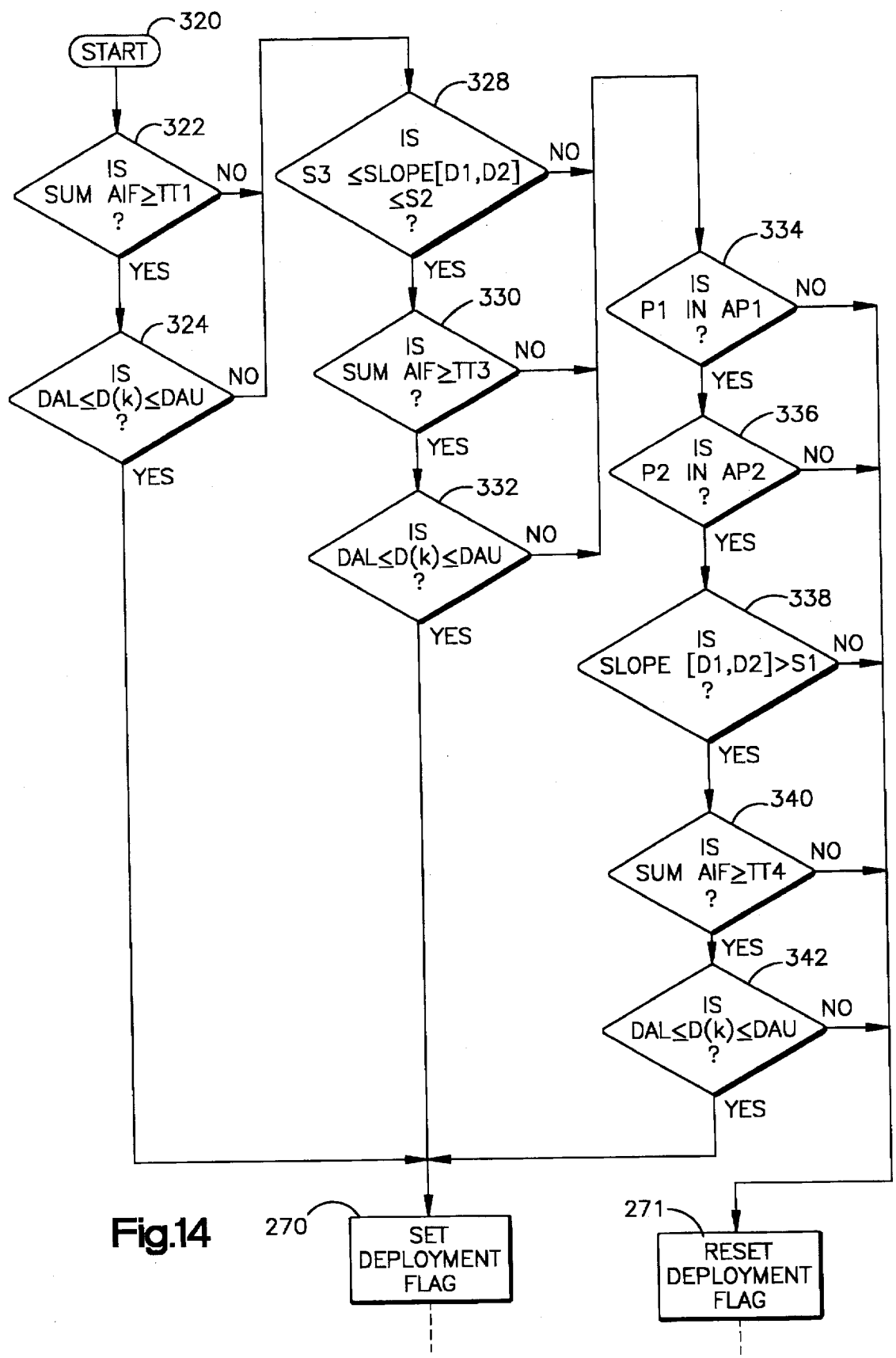

FIG. 14 is a flow chart of the crash metric CM2 process executed in step 282 to determine whether a crash event is occurring. The process enters at step 320 and proceeds to step 322. In step 322, it is determined whether the moving sum SUM AIF is greater than or equal to the threshold TT1 (see FIGS. 19 and 23). If the determination in step 322 is affirmative, the process proceeds to step 324. In step 324, a determination is made whether the crash displacement D(k) is within the crash displacement window defined by the thresholds DAL and DAU (see FIGS. 19 and 23). When the determination in step 324 is affirmative, the process proceeds to step 270 of FIG. 11, where the deployment crash event flag is set.

When either of the determinations in steps 322 or 324 are negative, the process proceeds to step 328. In step 328, a determination is made as to whether the Slope[D1,D2] is greater than or equal to a threshold S3 and less than or equal to a threshold S2. If the determination in step 328 is affirmative, the process proceeds to step 330. In step 330, it is determined whether the moving sum SUM AIF is greater than or equal to the threshold TT3 (see FIG. 26). When the determination in step 330 is affirmative, the process proceeds to step 332. In step 332, it is determined whether the crash displacement D(k) is within the crash displacement window defined by the thresholds DAL and DAU (see FIG. 26). When the determination in step 332 is affirmative, the process proceeds to step 270.

When any of the determinations made in steps 328, 330, or 332 are negative, the process proceeds to step 334. In step 334, it is determined whether the local maximum P1 of the DV Curve, as determined in the calculating routine of FIG. 8, is in the zone AP1 (see FIG. 28). If the determination in step 334 is affirmative, the process proceeds to step 336. In step 336, it is determined whether the local minimum P2 of the DV Curve, as determined in the calculating routine, is in the zone AP2 (see FIG. 28). If the determination in step 336 is affirmative, the process proceeds to step 338.

In step 338 a determination is made as to whether the Slope[D1,D2] is greater than or equal to a threshold S1. When the determination in step 338 is affirmative, the process proceeds to step 340. In step 340, it is determined whether the moving sum SUM AIF is greater than or equal to a threshold TT4 (see FIG. 30). If the determination in step 340 is affirmative, the process proceeds to step 342. In step 342, a determination is made whether the crash displacement D(k) is within the crash displacement window defined by the thresholds DAL and DAU (see FIG. 30). If the determination in step 342 is affirmative, the process proceeds to step 270 of FIG. 11, which sets the deployment crash event flag. When any of the determinations made in steps 334 to 342 are negative, the process proceeds to step 271 of FIG. 11. In step 271, the deployment crash event flag is reset.

Figure 15:
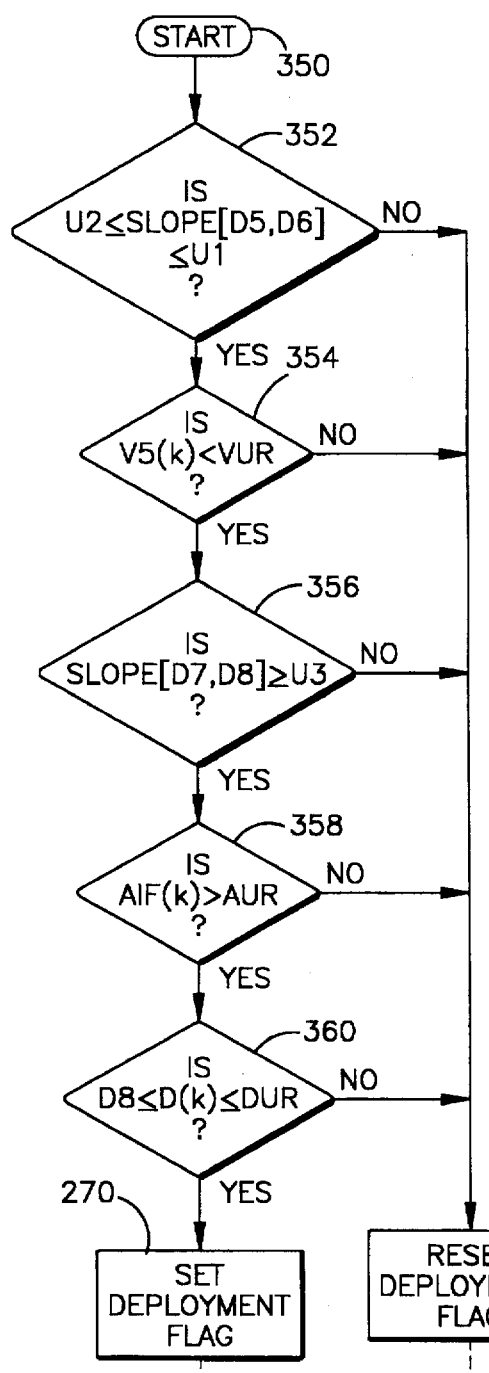

FIG. 15 is a flow chart of the crash metric CM3 process executed in step 286 of FIG. 11 to determine whether a deployment crash event is occurring. The process enters at step 350 and proceeds to step 352. In step 352, it is determined whether the Slope[D5,D6] is greater than or equal to a threshold U2 and less than or equal to a threshold U1 (see FIG. 31). If the determination in step 352 is affirmative, the process proceeds to step 354.

Figure 31:
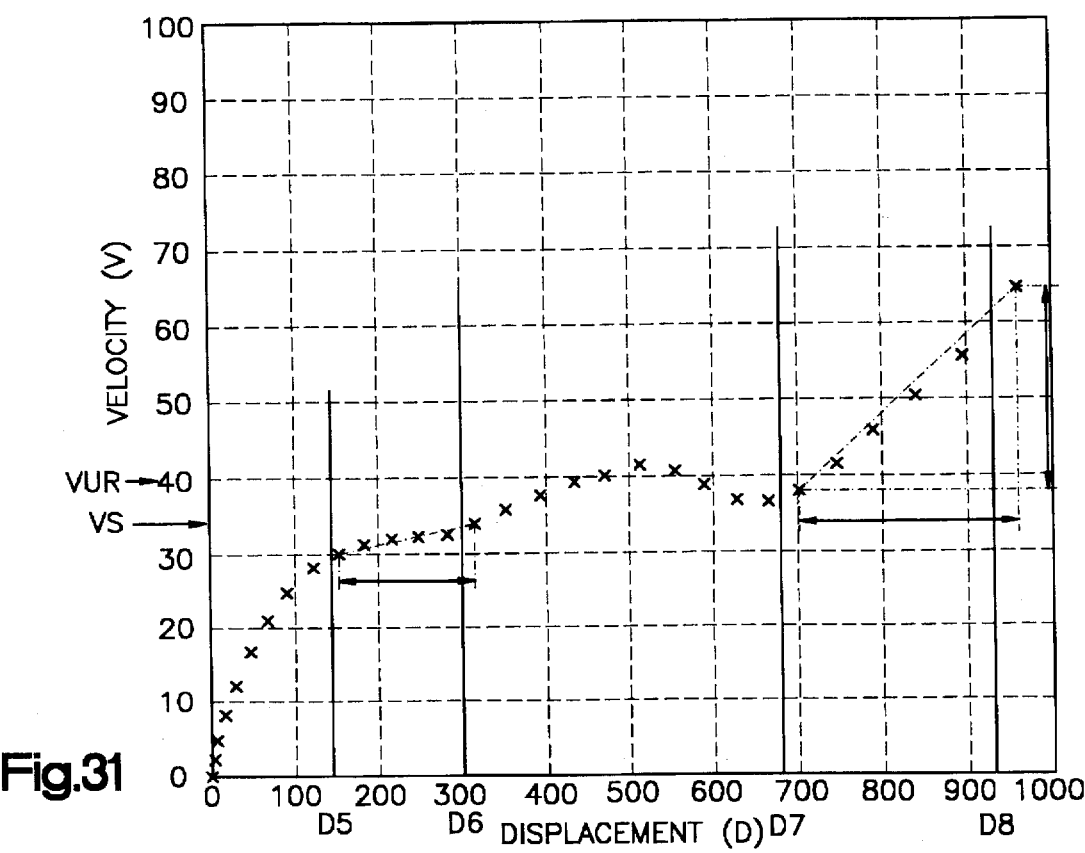

In step 354, it is determined if the crash velocity coordinate of the point P5, which is V5, is less than a threshold VUR (see FIG. 31). When the determination in step 354 is affirmative, the process proceeds to step 356. In step 356, a determination is made as to whether the Slope[D7,D8] is greater than or equal to a threshold U3 (see FIG. 31). When the determination in step 356 is affirmative, the process proceeds to step 358.

Figure 32:
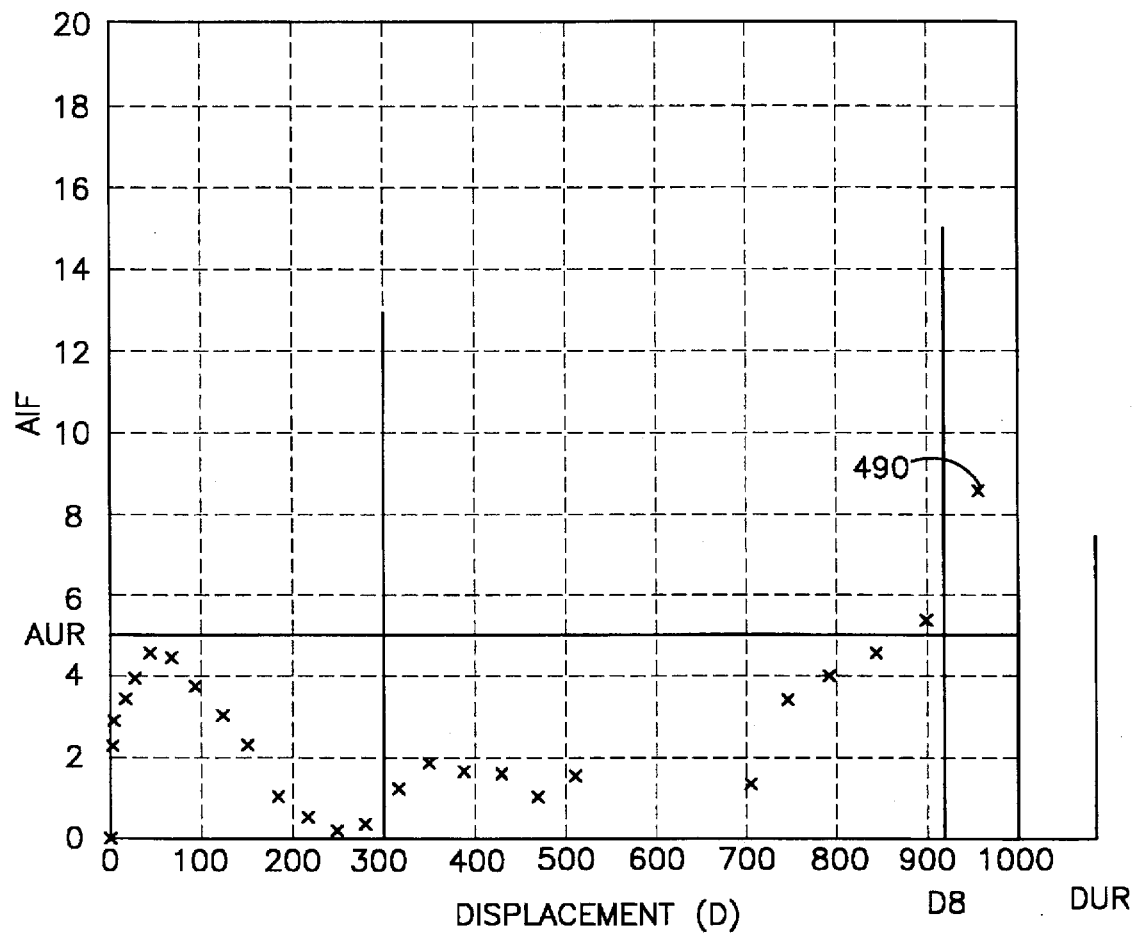

In step 358, it is determined whether the filtered digital acceleration AIF(k) is greater than a threshold AUR (see FIG. 32). If the determination in step 358 is affirmative, the process proceeds to step 360. In step 360, it is determined whether the crash displacement D(k) is within a crash displacement window defined by the thresholds D8 and DUR (see FIG. 32). When the determination in step 360 is affirmative, the process proceeds to step 270 of FIG. 11. In step 270, the deployment crash event flag is set. An affirmative determination in the CM3 metric indicates that an underride crash event is occurring.

When any of the determinations made in steps 352 through 360 are negative, the process proceeds to step 271 of FIG. 11. In step 271, the deployment crash event flag is reset, and program flow continues with step 272 of FIG. 11.

Referring to FIG. 5, the control process proceeds from step 220 to step 370 where a determination is made as to whether the evaluated crash metric from step 220 indicates a deployment crash event is occurring, i.e., is the deployment crash event flag set. If the determination in step 370 is affirmative, the process proceeds to step 378. In step 378, the air bag assembly 48 is actuated. If the determination in step 370 is negative, the process proceeds to step 380. In step 380, it is determined (in program functions equivalent to reset logic 384 of FIG. 2) whether the controller logic should be reset.

Figure 16:
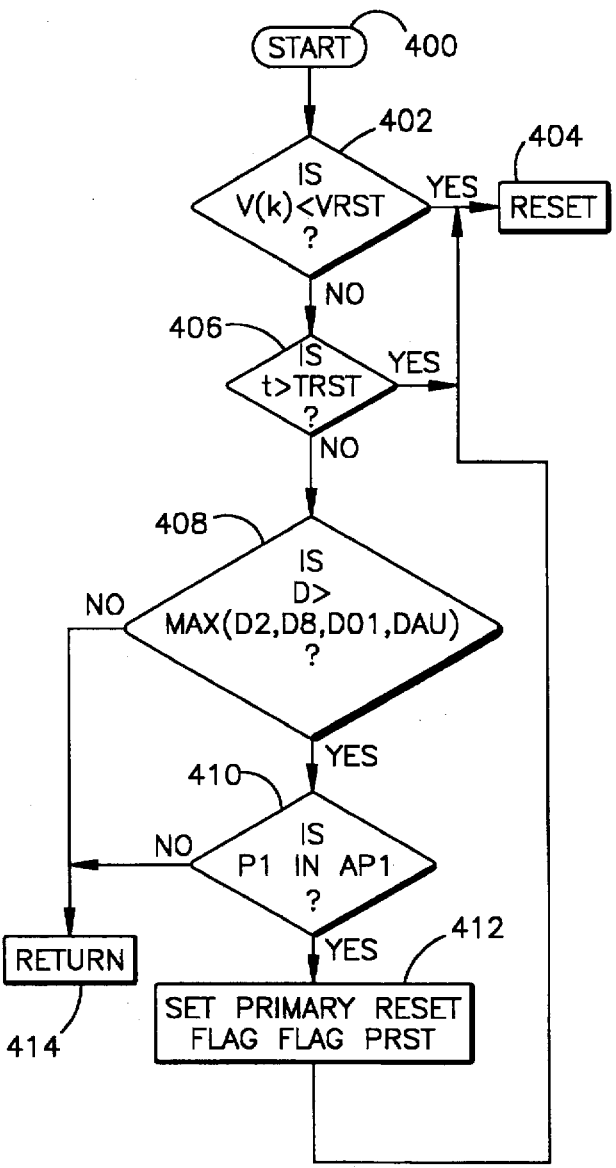

The reset logic 384 resets the signal processing logic 60, identification logic 86, calculating logic 88 and deployment logic 250 when certain criteria are satisfied. FIG. 16 is a flow chart of the equivalent process executed by the microcomputer of controller 46. The process is entered at step 400 and proceeds to step 402.

In step 402, a determination is made whether the crash velocity V(k) is less than a threshold value VRST. The threshold VRST is a user defined value that is typically selected to be zero, so that when the crash velocity V(k) becomes negative the controller logic is reset. When the determination in step 402 is affirmative, the process proceeds to step 404. In step 404, a reset flag is set. From step 404, the program proceeds to step 420 (FIG. 5)

If the determination in step 402 is negative, the process proceeds to step 406. In step 406, it is determined whether a time t has exceeded a threshold value TRST. The time t corresponds to a time timed out by a timer in the controller 46. The reset logic 384 starts the timer running once a filtered digital acceleration AIF(k) exceeds the threshold value 68 (2 g's). In other words, the time t is the length of time for which the controller 46 has been processing the filtered acceleration signal 44. The threshold TRST is a user defined value that is selected for the particular vehicle platform of interest. When the determination in step 406 is affirmative, the process proceeds to step 404 and the reset flag is set.

If the determination in step 406 is negative, the process proceeds to step 408. In step 408, a determination is made as to whether the crash displacement D(k) is greater than any of the displacement values D2, D8, D01, and DAU. If the determination in step 408 is affirmative, the process proceeds to step 410. In step 410, it is determined whether the calculating logic 88 indicates that the local maximum P1 of the DV curve is in the zone AP1. When the determination in step 410 is affirmative, the process proceeds to step 412. In step 412, a flag PRST in the controller 46 is set. From step 412, the process proceeds to step 404. In step 404, the reset flag is set.

When either of the determinations made in steps 408 or 410 are negative, the process proceeds to step 414. In step 414, the process returns to the main loop shown in FIG. 5. The process, more specifically, loops back to step 102 and the control process starts over, deciding anew with further data point whether air bag deployment is required. If the determination in step 380 is affirmative, the process proceeds to step 420.

In step 420, the controller is reset if the reset flag has been set. Upon being reset, the controller initializes all parameters determined by the controller logic, with the exception of the flag FLAG PRST.

From step 420, the process proceeds to step 424. In step 424, it is determined whether the flag PRST is set. When the flag PRST is set, it means that the primary reset mode (steps 408 and 410 in FIG. 16) of the reset logic 384 caused the controller reset. If the determination in step 424 is affirmative, the process loops back to step 102 and the control process starts over. In this case, the control process immediately begins revaluating the filtered digital acceleration AIF(k) to detect a crash event.

When the determination in step 424 is negative, the process proceeds to step 426. In step 426, the flag AIF is reset. From step 426, the process loops back to step 102 and the control process starts over. In this case, evaluation of the filtered digital acceleration AIF(k) will not begin again until that acceleration exceeds the threshold 68 (2 g's).

FIGS. 17–32 are graphs from a plurality of different types of crash events, each illustrating parameters determined by the present invention. The DV curve is drawn as "X's". The borders of zones are shown as solid lines.

Figure 17:
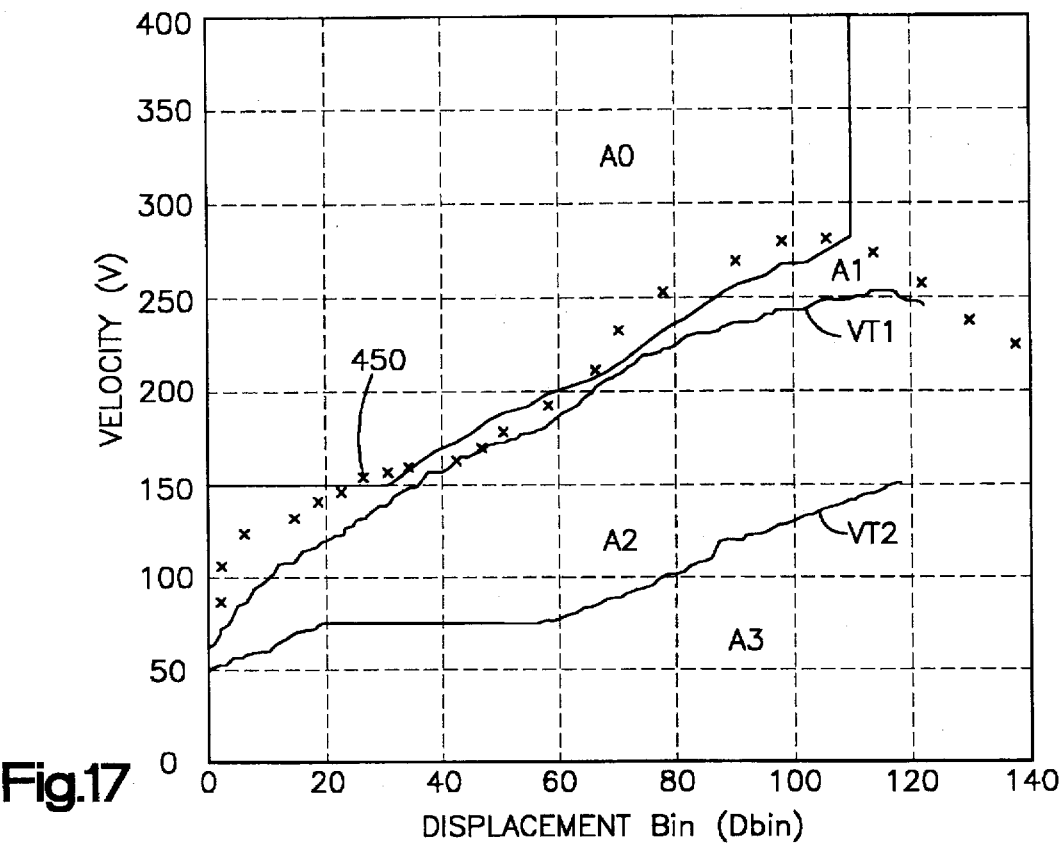
FIGS. 17–32 are graphical illustrations of system determinations for various types of crash conditions.

FIG. 17 shows the DV curve for a 30 mph head-on barrier crash event. At the point 450, the deployment logic 250 determines that the DV curve is in the deployment criteria zone AØ. As a result, the crash metric CMØ determines a deployment crash event is occurring and the air bag assembly 48 is actuated.

Figure 18:
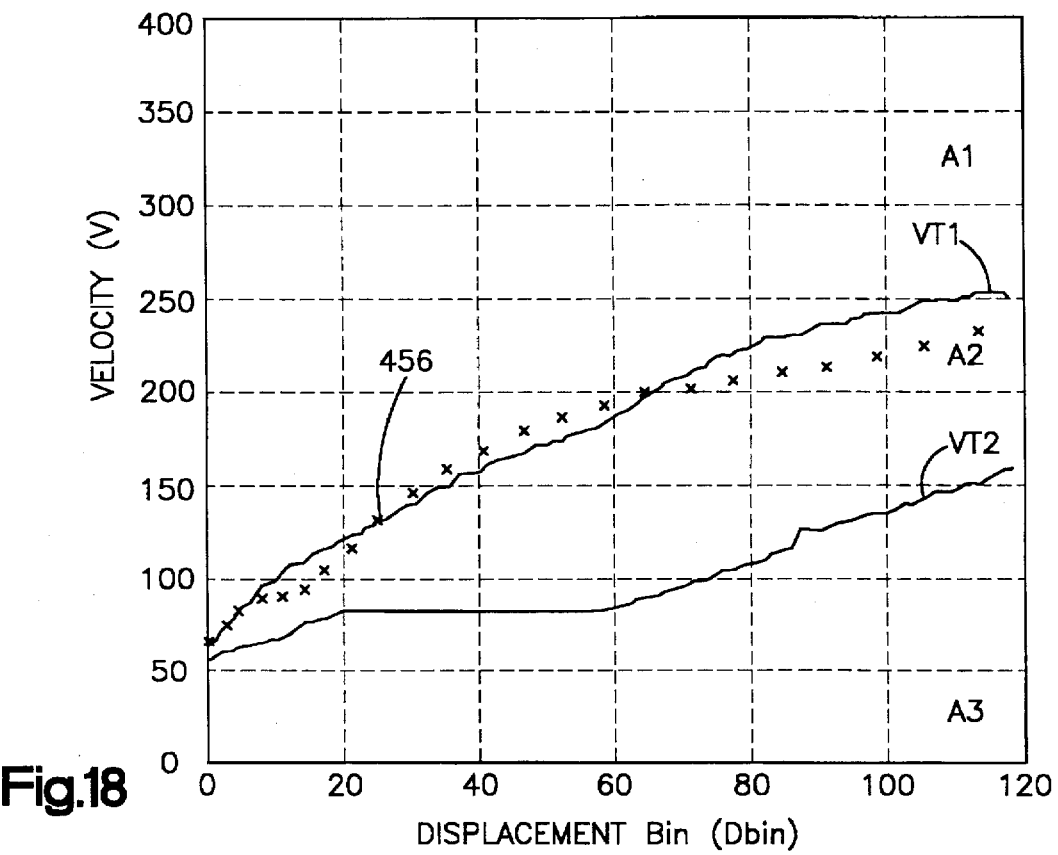
Figure 19:
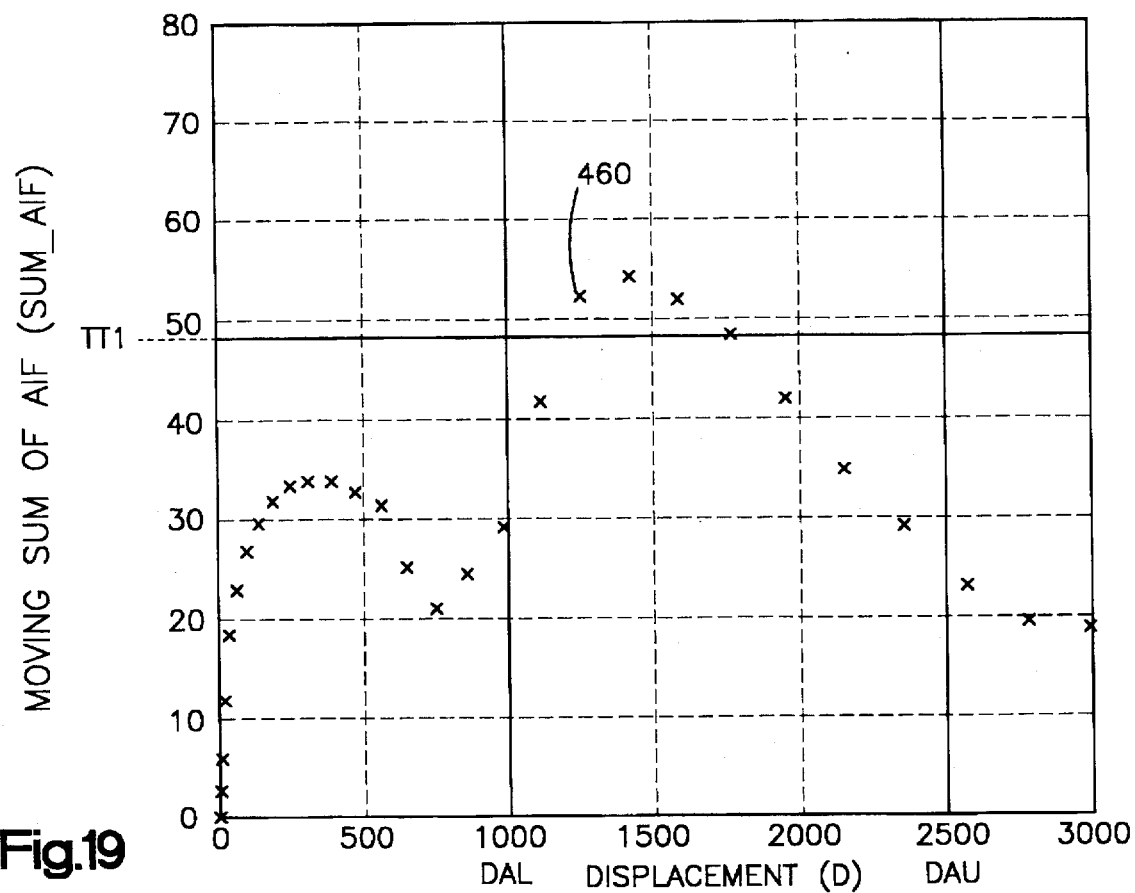

FIGS. 18 and 19 show the DV curve, and the moving sum SUM AIF as a function of the crash displacement D(k), respectively, for a 14 mph head-on barrier crash (a similar DV curve also occurs for a 30 mph 30° angular crash event).

At the point 456 in FIG. 18, the deployment logic 250 determines the DV curve is in the deployment criteria zone A1 and the crash metric CM1 is evaluated. In FIG. 19, at the point 460, the crash metric CM1 determines that a deployment crash event is occurring and the air bag assembly 28 is actuated.

Figure 20:
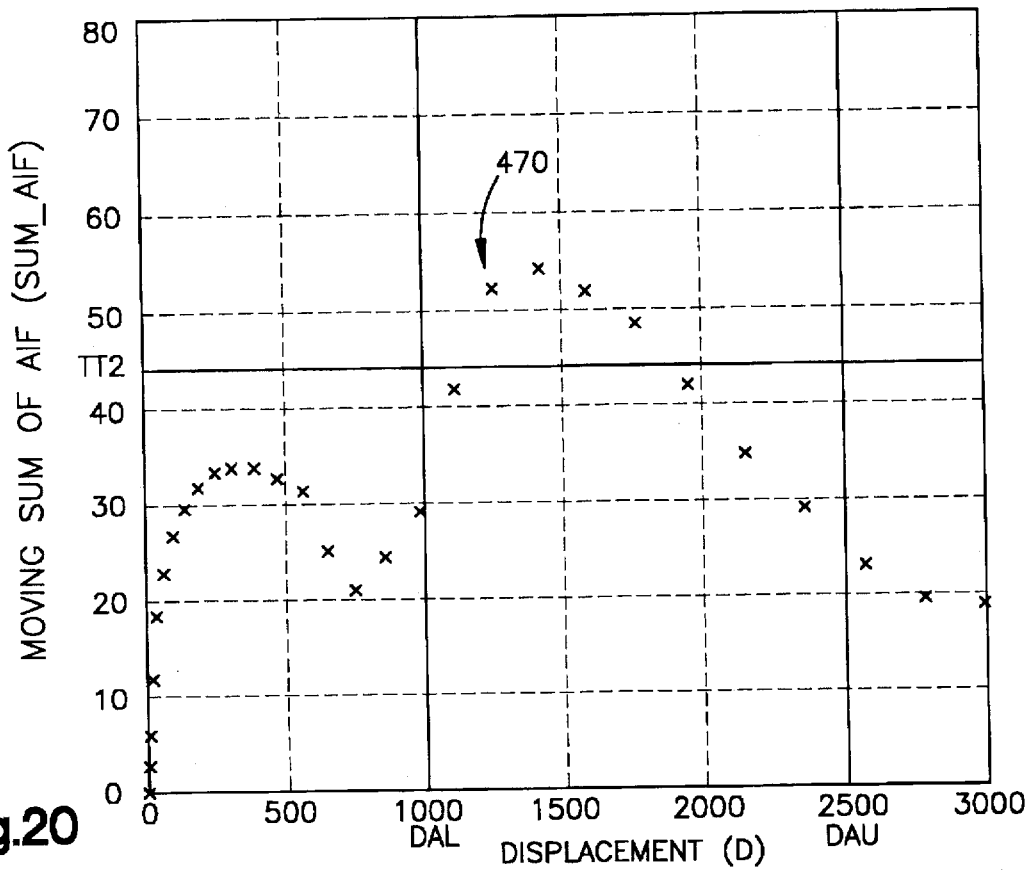
Figure 21:
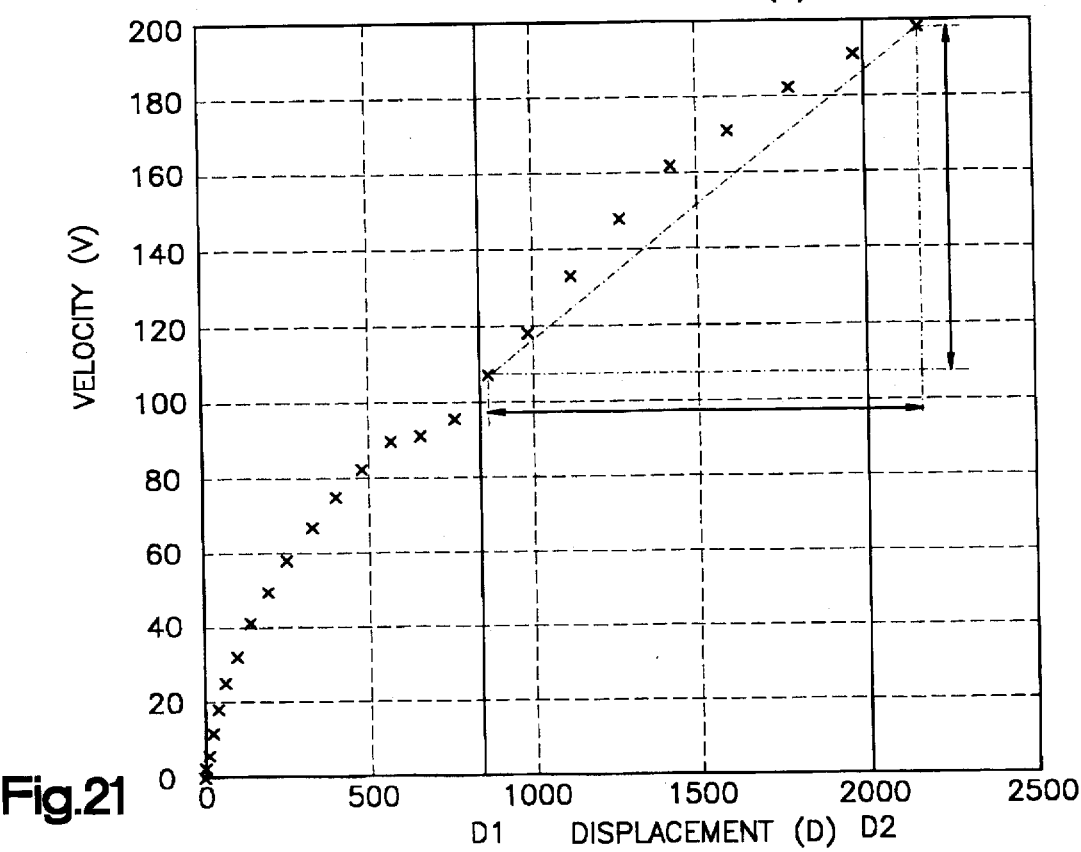

FIGS. 18, 20 and 21 show the DV curve, the moving sum SUM AIF as a function of the crash displacement a 14 mph head-on barrier crash D(K), and the Slope [d1, d2], respectively, for the alternative method employed by crash metric CM1 to detect a 14 mph head-on barrier crash event. At the point 456 in FIG. 18, the deployment logic 250 determines the DV curve is in the deployment criteria zone A1 and the crash metric CM1 is evaluated. In FIG. 20, at the point 470, and in FIG. 21 for the illustrated Slope [D1, D2], the crash metric CM1 determines that a deployment crash event is occurring and the air bag assembly 28 is actuated.

Figure 22:
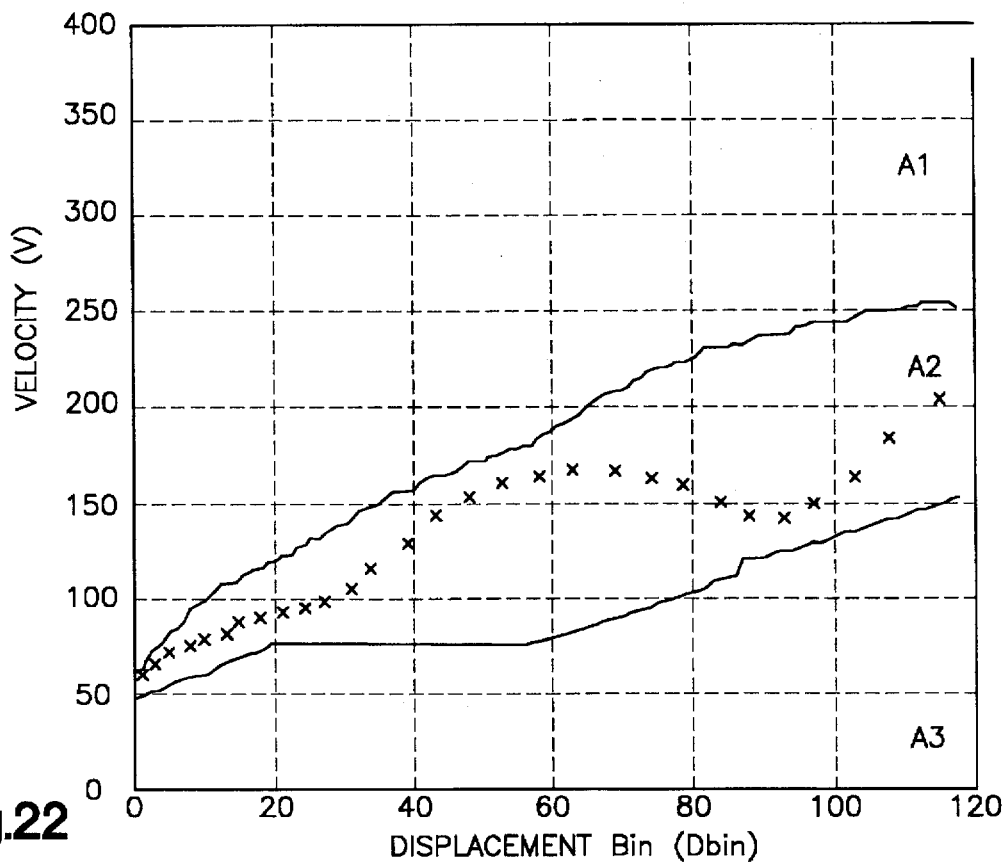
Figure 23:
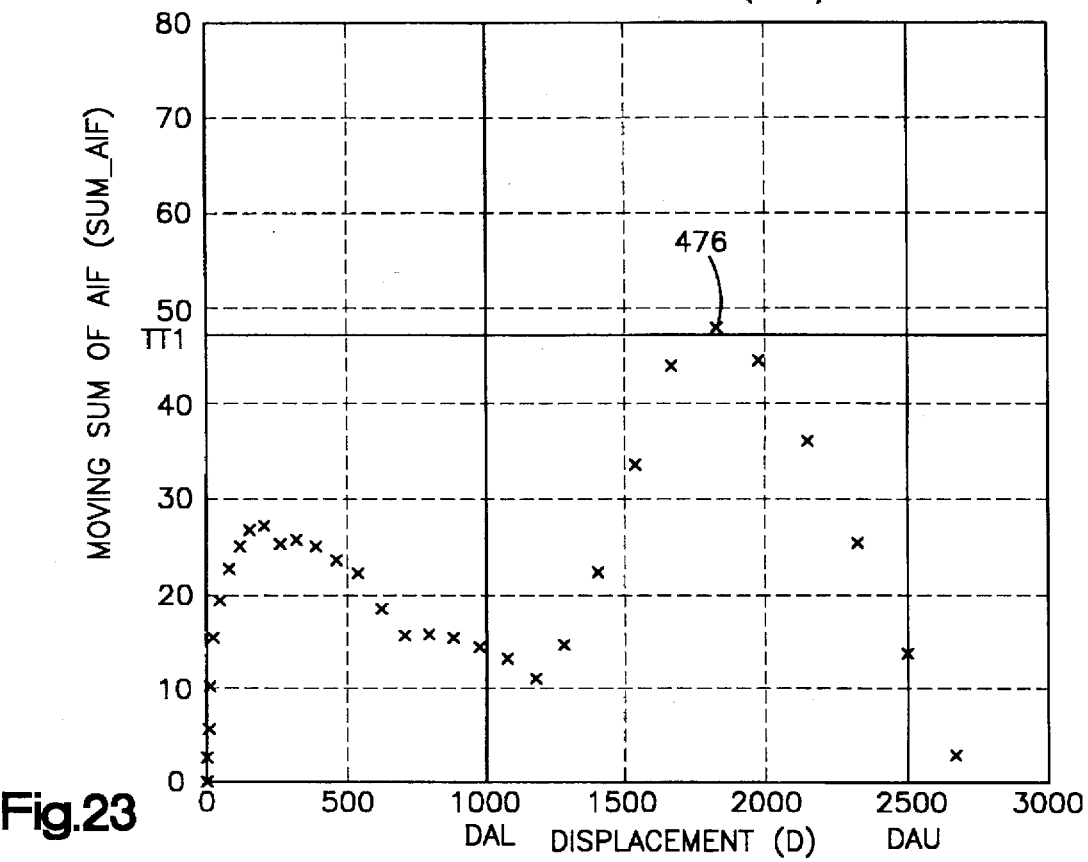

FIGS. 22 and 23 show the DV curve and the moving sum SUM AIF as a function of the crash displacement D(K), respectively, for a 14 mph head-on barrier crash event of a different vehicle platform (a similar curve occurs for a 30 mph 30° angular crash event). As shown in FIG. 22, the deployment logic 250 determines the DV curve is in the deployment criteria zone A2 and the crash metric CM2 is evaluated. In FIG. 23, at the point 476, the crash metric CM2 determines that a deployment crash event is occurring and the air bag assembly 28 is actuated.

Figure 24:
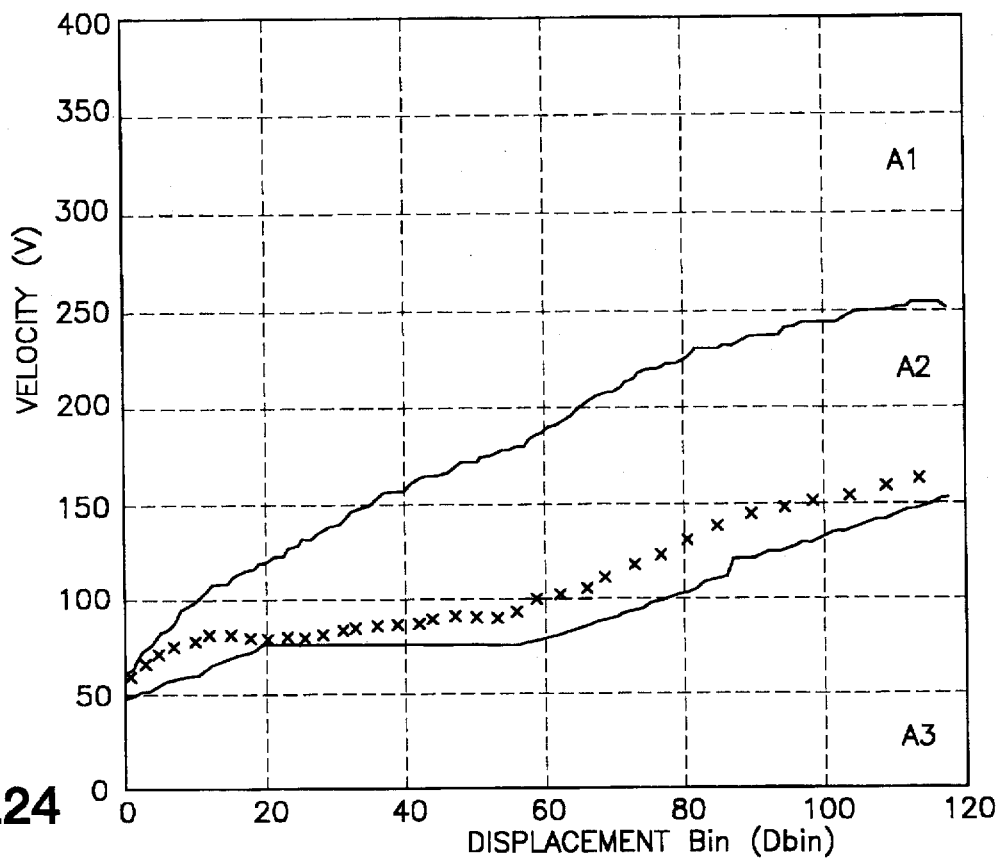
Figure 25:
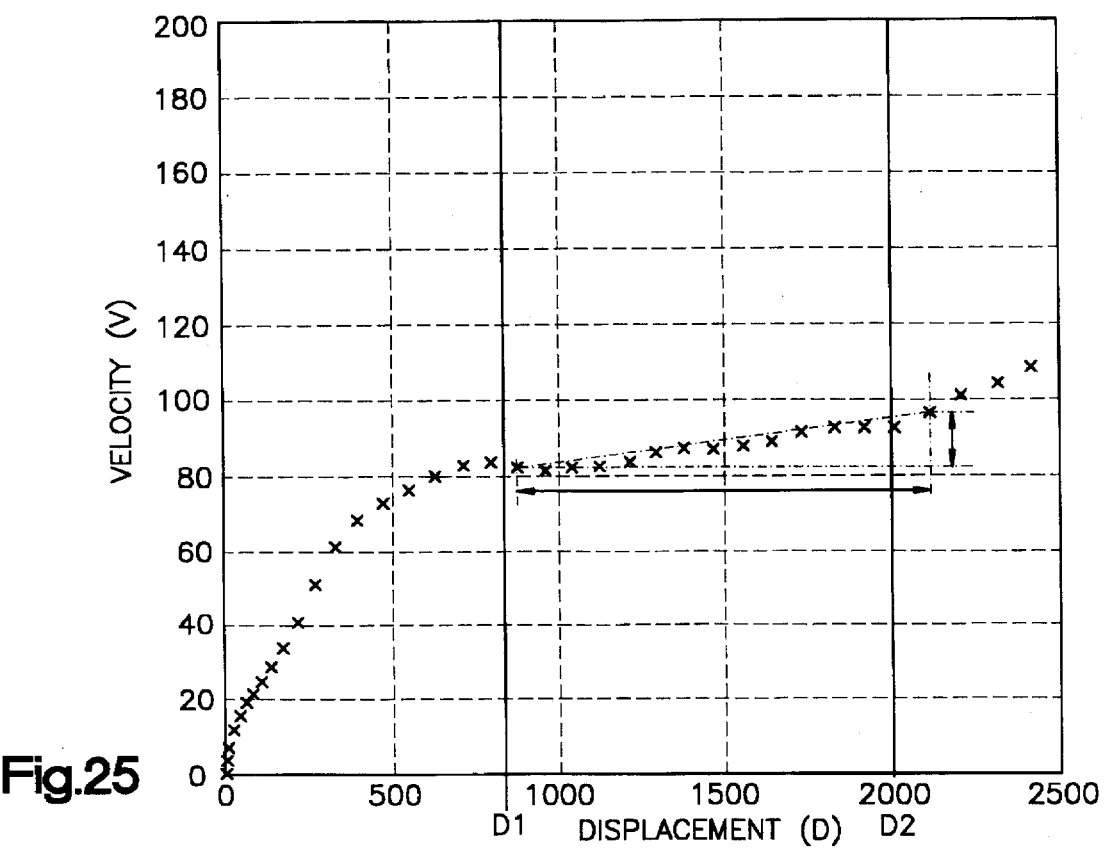
Figure 26:
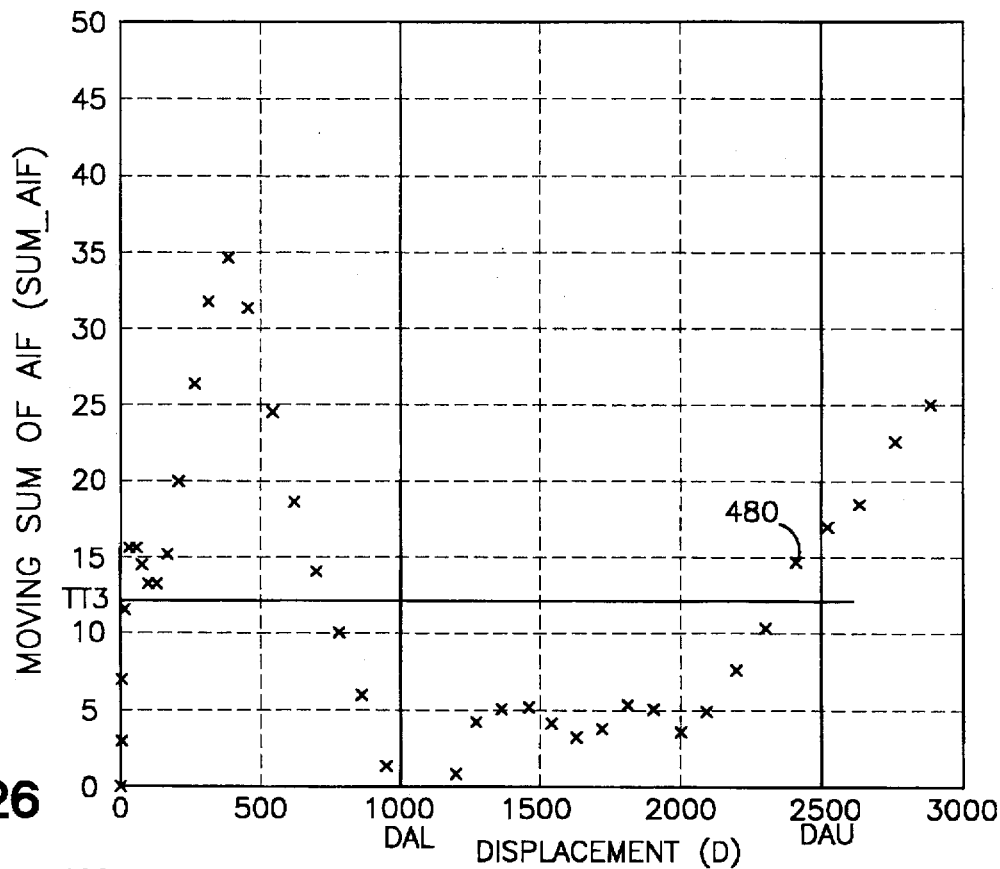

FIGS. 24 to 26 show the DV curve, the slope [D1,D2] and the moving sum SUM_AIF versus crash displacement D(k), respectively, for a 30 mph 30° angular crash event. FIG. 24 shows that the DV curve is in the deployment criteria zone A2, and therefore, the crash metric CM2 is evaluated. For the Slope [D1,D2] shown in FIG. 25, and the point 480 in FIG. 26, the crash metric CM2 determines that a deployment crash event is occurring and the air bag assembly 28 is actuated.

Figure 27:
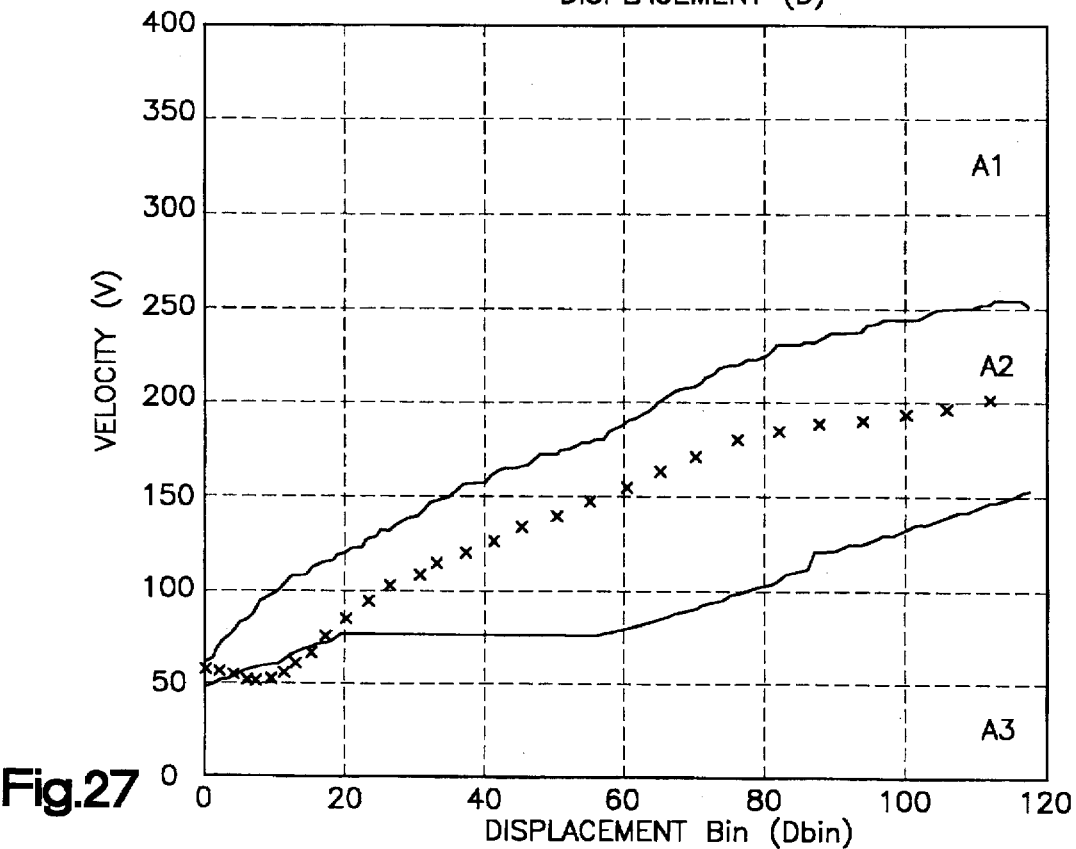
Figure 28:
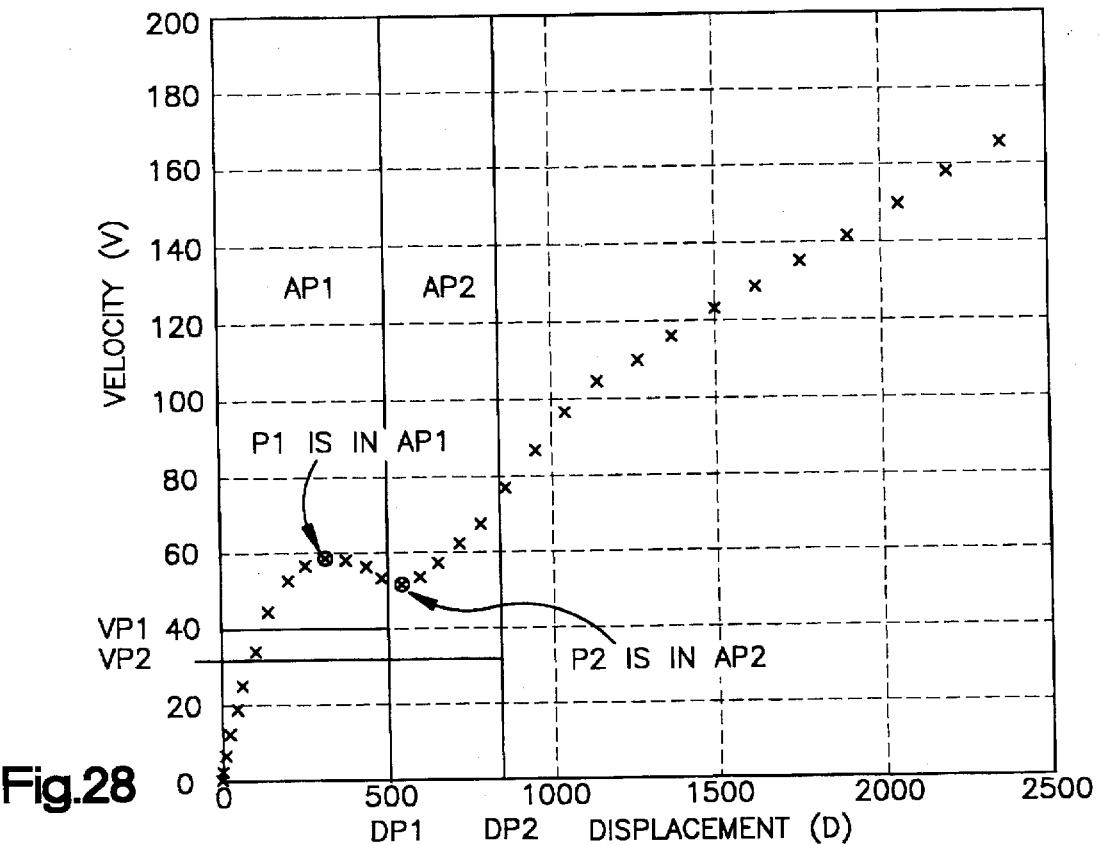
Figure 29:
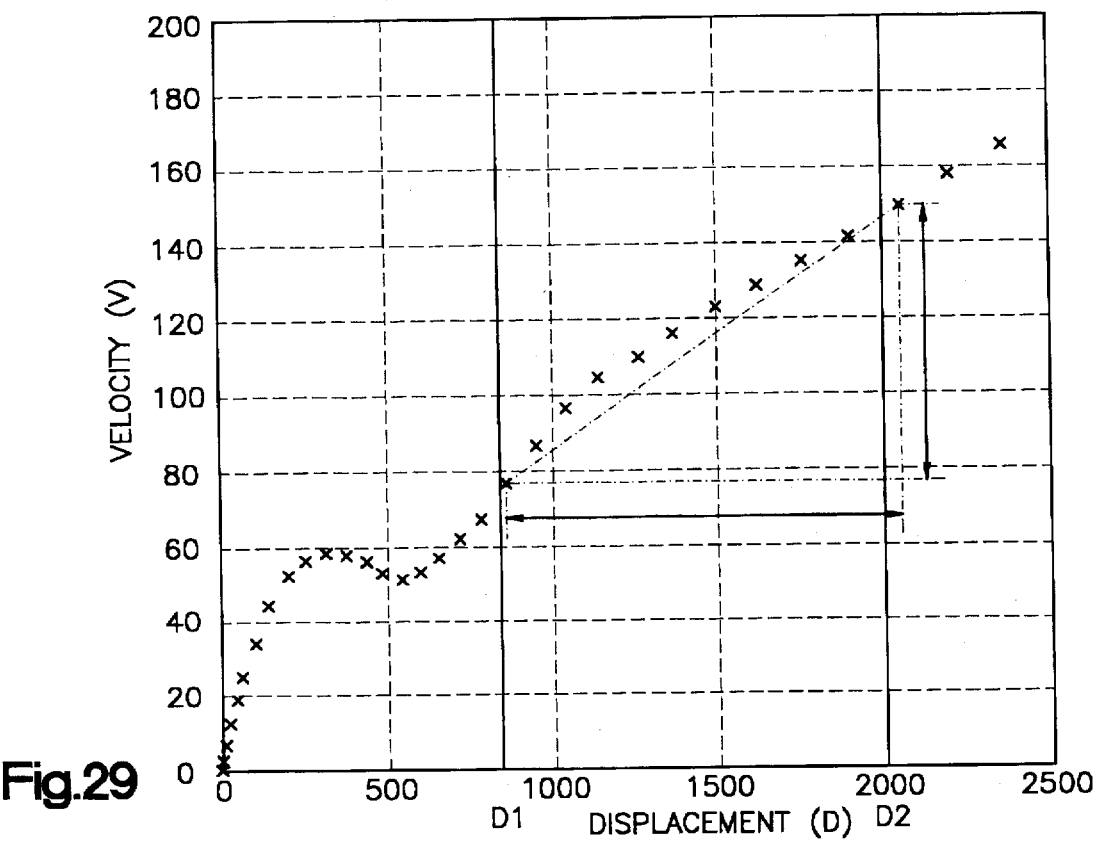
Figure 30:
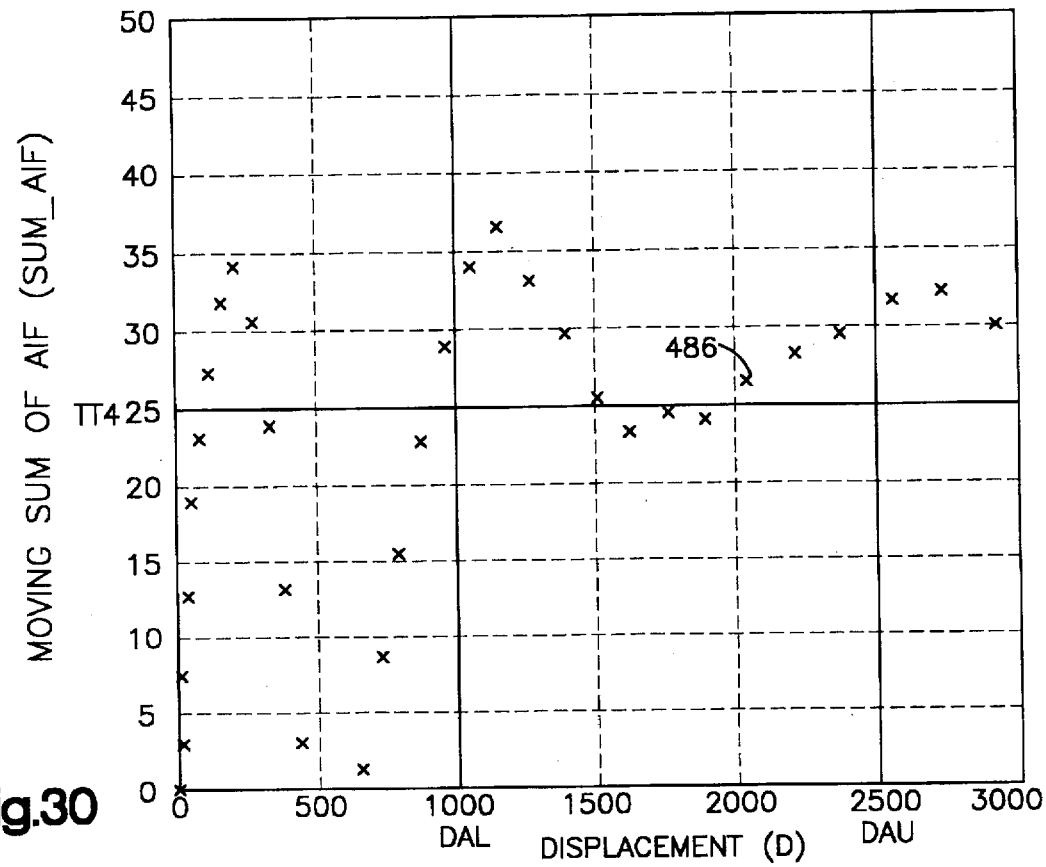

FIGS. 27 to 30 show the DV curve, the local maximum P1 and local minimum P2 of that curve, the Slope [D1,D2], and the moving sum SUM AIF versus crash displacement D(k), respectively, for a 30 mph 0° pole crash event. FIG. 27 shows that the DV curve is in the deployment criteria zone A2, and consequently the crash metric CM2 is evaluated. FIG. 28 shows the local maximum P1 is in the zone AP1 and the local minimum is in the zone AP2. FIG. 29 shows a Slope [D1,D2] that is greater than the threshold S1. FIG. 30 shows that the moving sum SUM AIF is greater than the threshold TT4 for the crash displacement D(k) between the threshold DAL and DAU at the point 486. As a result, the crash metric CM2 determines a deployment crash event is occurring and the air bag assembly 28 is actuated.

FIGS. 31 and 32 show crash velocity V(k) versus crash displacement D(k), and moving sum SUM AIF versus crash displacement D(k), respectively, for a 20 mph head-on underride crash event. From the average slopes shown in FIG. 31, and the point 490 in FIG. 32, the crash metric CM3 determines a deployment crash event is occurring and the air bag assembly 28 is actuated.

Those skilled in the art will appreciate that the present invention may be used with a tailorable occupant restraint system of the type described in U.S. Pat. No. 5,330,226 to Gentry et al. and U.S. Pat. No. 5,232,243 to Blackburn et al., both of which are hereby fully incorporated herein by reference. For example, the deployment logic 250 would control operation of a tailorable occupant restraint in response to the selected identification zone and control logic. These controls include control of vent valves, the number of gas generators actuated, air bag aiming, air bag position, actuation of pretensioners, etc.

From the above description of the invention, those skilled in the art will perceive improvements, alternatives, and modifications. Such improvements, alternatives, and modifications within the skill of the art are intended to be covered by the appended claims.

Having described the invention, the following is claimed:

1. An apparatus for detecting a vehicle crash condition and providing a signal indicative of such a crash condition, comprising:

velocity means for providing a crash velocity signal having a value indicative of crash velocity;

displacement means for providing a crash displacement signal having a value indicative of crash displacement; and control means connected to said velocity means and said displacement means and having a plurality of deployment criteria zones, each of said deployment criteria zones being defined by an associated range of crash velocity values and an associated range of crash displacement values and each of said plurality of deployment criteria zones having at least one associated crash metric, said control means including, selection means for selecting one of said plurality of deployment criteria zones in response to both said crash velocity signal and said crash displacement signal, and deployment determining means for determining whether a crash metric of said selected deployment criteria zone indicates that a deployment crash condition is occurring and providing a deployment signal in response thereto.

2. The apparatus of claim 1 further including a means for determining crash acceleration and providing a crash acceleration signal having a value indicative of crash acceleration.

3. The apparatus of claim 2 wherein said velocity means includes means for integrating said crash acceleration signal over time to provide said crash velocity signal.

4. The apparatus of claim 2 wherein said displacement means includes means for double integrating said crash acceleration signal over time to provide said crash displacement signal.

5. The apparatus of claim 1 wherein said control means has at least three criteria zones wherein each of said criteria zones is assigned an associated priority value, and wherein said selection means selects a highest criteria zone in which a velocity and displacement value falls.

6. The apparatus of claim 5 wherein said determining means provides said deployment signal whenever a velocity value and displacement value falls in said highest priority criteria zone.

7. The apparatus of claim 1 wherein at least one of said crash metrics is based on the change in velocity and displacement values.

8. The apparatus of claim 1 wherein at least one of said crash metrics is based upon the occurrence of a maximum value of velocity and displacement values and a minimum value of velocity and displacement values occurring in specific criteria zones.

9. The apparatus of claim 1 further including an occupant restraint system for restraining movement of a vehicle occupant in response to said deployment signal.

10. The apparatus of claim 9 wherein said occupant restraint system is an air bag.

11. The apparatus of claim 1 further including an occupant restraint system for restraining movement of a vehicle occupant in response to both said deployment signal and said selected deployment zone.

12. The apparatus of claim 11 wherein said occupant restraint system further includes means for tailoring the restraint system in response to said selected deployment zone.

13. A method for detecting a vehicle crash condition and providing a signal indicative thereof, said method comprising the steps of:

determining crash velocity and providing a crash velocity signal having a value indicative of crash velocity;

determining crash displacement and providing a crash displacement signal having a value indicative of crash displacement; and establishing a plurality of deployment criteria zones wherein each established deployment criteria zone is defined by an associated range of crash velocity values and range of crash displacement values;

establishing at least one associated crash metric for each of said deployment criteria zones;

selecting one of said plurality of deployment criteria zones in response to both said crash velocity signal and said crash displacement signal;

determining whether a crash metric of said selected deployment criteria zone indicates that a deployment crash condition is occurring; and providing a deployment signal when said selected deployment criteria zone indicates that a deployment crash condition is occurring.

* * * * *